US008959016B2

(12) United States Patent
McKenna et al.

(10) Patent No.: US 8,959,016 B2
(45) Date of Patent: Feb. 17, 2015

(54) ACTIVATING FUNCTIONS IN PROCESSING DEVICES USING START CODES EMBEDDED IN AUDIO

(75) Inventors: William McKenna, Columbia, MD (US); Jason Bolles, Columbia, MD (US); John Kelly, Columbia, MD (US); John Stavropoulos, Edison, NJ (US); Alan Neuhauser, Silver Spring, MD (US); Wendell Lynch, East Lansing, MI (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 13/341,365

(22) Filed: Dec. 30, 2011

(65) Prior Publication Data

US 2012/0203559 A1 Aug. 9, 2012

Related U.S. Application Data

(63) Continuation-in-part of application No. 13/046,360, filed on Mar. 11, 2011, now Pat. No. 8,731,906, which is a continuation of application No. 11/805,075, filed on May 21, 2007, now Pat. No. 7,908,133, which is a continuation-in-part of application No. 10/256,834, filed on Sep. 27, 2002, now Pat. No. 7,222,071, application No. 13/341,365, which is a continuation of application No. 13/307,649, filed on Nov. 30, 2011.

(51) Int. Cl.
*G10L 15/00* (2013.01)

(52) U.S. Cl.
USPC .............. 704/205; 704/206; 704/231; 725/19

(58) Field of Classification Search
USPC ............................ 704/205, 206, 231; 725/19
See application file for complete search history.

(56) References Cited

U.S. PATENT DOCUMENTS

| | | | |
|---|---|---|---|
| 2,662,168 | A | 12/1953 | Scherbaysoy |
| 3,372,233 | A | 3/1968 | Currey |
| 3,845,391 | A | 10/1974 | Crosby |

(Continued)

FOREIGN PATENT DOCUMENTS

| | | |
|---|---|---|
| AU | 2003230993 | 11/2003 |
| AU | 2006230639 | 9/2006 |

(Continued)

OTHER PUBLICATIONS

United States Patent and Trademark Office, "Final Office Action," issued in connection with U.S. Appl. No. 10/256,834, on Jun. 21, 2005, 18 pages.

(Continued)

*Primary Examiner* — Daniel D Abebe

(74) *Attorney, Agent, or Firm* — Hanley, Flight & Zimmerman, LLC

(57) ABSTRACT

Apparatus, system and method for performing an action such as accessing supplementary data and/or executing software on a device capable of receiving multimedia are disclosed. After multimedia is received, a monitoring code is detected and a signature is extracted in response thereto from an audio portion of the multimedia. The ancillary code includes a plurality of code symbols arranged in a plurality of layers in a predetermined time period, and the signature is extracted from features of the audio of the multimedia. Supplementary data is accessed and/or software is executed using the detected code and/or signature.

20 Claims, 13 Drawing Sheets

(56) References Cited

U.S. PATENT DOCUMENTS

| | | | |
|---|---|---|---|
| 3,919,479 | A | 11/1975 | Moon |
| 4,025,851 | A | 5/1977 | Haselwood et al. |
| 4,230,990 | A | 10/1980 | Lert |
| 4,425,661 | A | 1/1984 | Moses |
| 4,450,531 | A | 5/1984 | Kenyon |
| 4,622,583 | A | 11/1986 | Watanabe et al. |
| 4,633,302 | A | 12/1986 | Damoci |
| 4,639,779 | A | 1/1987 | Greenberg |
| 4,672,605 | A | 6/1987 | Hustig |
| 4,677,466 | A | 6/1987 | Lert |
| 4,697,209 | A | 9/1987 | Kiewit |
| 4,739,398 | A | 4/1988 | Thomas |
| 4,745,468 | A | 5/1988 | Von Kohorn |
| 4,764,808 | A | 8/1988 | Solar |
| 4,843,562 | A | 6/1989 | Kenyon |
| 4,847,685 | A | 7/1989 | Gall et al. |
| 4,876,592 | A | 10/1989 | Von Kohorn |
| 4,905,080 | A | 2/1990 | Watanabe et al. |
| 4,918,730 | A | 4/1990 | Schulze |
| 4,926,255 | A | 5/1990 | Von Kohorn |
| 4,955,070 | A | 9/1990 | Welsh |
| 4,972,471 | A | 11/1990 | Gross |
| 4,973,952 | A | 11/1990 | Malec et al. |
| 5,019,899 | A | 5/1991 | Boles et al. |
| 5,023,929 | A | 6/1991 | Call |
| 5,034,807 | A | 7/1991 | Von Kohorn |
| 5,057,915 | A | 10/1991 | Von Kohorn |
| 5,117,228 | A | 5/1992 | Fuchigami et al. |
| 5,165,069 | A | 11/1992 | Vitt et al. |
| 5,214,793 | A | 5/1993 | Conway et al. |
| 5,227,874 | A | 7/1993 | Von Kohorn |
| 5,283,734 | A | 2/1994 | Von Kohorn |
| 5,294,977 | A | 3/1994 | Fisher et al. |
| 5,319,735 | A | 6/1994 | Preuss |
| 5,331,544 | A | 7/1994 | Lu et al. |
| 5,373,315 | A | 12/1994 | Dufresne et al. |
| 5,382,983 | A | 1/1995 | Kwoh et al. |
| 5,425,100 | A | 6/1995 | Thomas |
| 5,444,769 | A | 8/1995 | Koen et al. |
| 5,450,490 | A | 9/1995 | Jensen |
| 5,481,294 | A | 1/1996 | Thomas |
| 5,485,199 | A | 1/1996 | Elkind et al. |
| 5,485,634 | A | 1/1996 | Weiser et al. |
| 5,495,282 | A | 2/1996 | Mostafa et al. |
| 5,510,828 | A | 4/1996 | Lutterbach et al. |
| 5,512,933 | A | 4/1996 | Wheatley |
| 5,524,195 | A | 6/1996 | Clanton, III et al. |
| 5,526,427 | A | 6/1996 | Thomas et al. |
| 5,541,585 | A | 7/1996 | Duhame et al. |
| 5,543,856 | A | 8/1996 | Rosser et al. |
| 5,572,246 | A | 11/1996 | Ellis et al. |
| 5,574,962 | A | 11/1996 | Fardeau |
| 5,579,124 | A | 11/1996 | Aijala |
| 5,581,800 | A | 12/1996 | Fardeau |
| 5,594,934 | A | 1/1997 | Lu |
| 5,608,445 | A | 3/1997 | Mischler |
| 5,612,729 | A | 3/1997 | Ellis |
| 5,612,741 | A | 3/1997 | Loban et al. |
| 5,629,739 | A | 5/1997 | Dougherty |
| 5,659,366 | A | 8/1997 | Kerman |
| 5,666,293 | A | 9/1997 | Metz et al. |
| 5,682,196 | A | 10/1997 | Freeman |
| 5,687,191 | A | 11/1997 | Lee et al. |
| 5,719,634 | A | 2/1998 | Keery et al. |
| 5,734,413 | A | 3/1998 | Lappington et al. |
| 5,737,025 | A | 4/1998 | Dougherty et al. |
| 5,737,026 | A | 4/1998 | Lu |
| 5,740,035 | A | 4/1998 | Cohen et al. |
| 5,764,763 | A | 6/1998 | Jensen |
| 5,787,334 | A | 7/1998 | Fardeau |
| 5,796,785 | A | 8/1998 | Spiero |
| 5,815,671 | A | 9/1998 | Morrison |
| 5,828,325 | A | 10/1998 | Wolosewicz |
| 5,841,978 | A | 11/1998 | Rhoads |
| 5,848,155 | A | 12/1998 | Cox |
| 5,850,249 | A | 12/1998 | Massetti et al. |
| 5,872,588 | A | 2/1999 | Aras et al. |
| 5,880,789 | A | 3/1999 | Inaba |
| 5,889,548 | A | 3/1999 | Chan |
| 5,893,067 | A | 4/1999 | Bender et al. |
| 5,907,366 | A | 5/1999 | Farmer et al. |
| 5,918,223 | A | 6/1999 | Blum et al. |
| 5,930,369 | A | 7/1999 | Cox et al. |
| 5,945,932 | A | 8/1999 | Smith |
| 5,956,716 | A | 9/1999 | Kenner et al. |
| 5,966,120 | A | 10/1999 | Arazi et al. |
| 5,978,855 | A | 11/1999 | Metz et al. |
| 6,034,722 | A | 3/2000 | Viney et al. |
| 6,035,177 | A | 3/2000 | Moses |
| 6,097,441 | A | 8/2000 | Allport |
| 6,128,597 | A | 10/2000 | Kolluru et al. |
| 6,154,209 | A | 11/2000 | Naughton et al. |
| 6,154,484 | A | 11/2000 | Lee |
| 6,157,413 | A | 12/2000 | Hanafee et al. |
| 6,175,627 | B1 | 1/2001 | Petrovic |
| 6,208,735 | B1 | 3/2001 | Cox et al. |
| 6,216,129 | B1 | 4/2001 | Eldering |
| 6,266,815 | B1 | 7/2001 | Shen et al. |
| 6,286,036 | B1 | 9/2001 | Rhoads |
| 6,286,140 | B1 | 9/2001 | Ivanyi |
| 6,298,348 | B1 | 10/2001 | Eldering |
| 6,300,888 | B1 | 10/2001 | Chen et al. |
| 6,308,327 | B1 | 10/2001 | Liu et al. |
| 6,331,876 | B1 | 12/2001 | Koster et al. |
| 6,335,736 | B1 | 1/2002 | Wagner et al. |
| 6,360,167 | B1 | 3/2002 | Millington |
| 6,363,159 | B1 | 3/2002 | Rhoads |
| 6,389,055 | B1 | 5/2002 | August et al. |
| 6,400,827 | B1 | 6/2002 | Rhoads |
| 6,411,725 | B1 | 6/2002 | Rhoads |
| 6,421,445 | B1 | 7/2002 | Jensen et al. |
| 6,466,913 | B1 | 10/2002 | Yasuda et al. |
| 6,467,089 | B1 | 10/2002 | Aust et al. |
| 6,487,564 | B1 | 11/2002 | Asai et al. |
| 6,505,160 | B1 | 1/2003 | Levy et al. |
| 6,512,836 | B1 | 1/2003 | Xie et al. |
| 6,513,014 | B1 | 1/2003 | Walker et al. |
| 6,522,771 | B2 | 2/2003 | Rhoads |
| 6,539,095 | B1 | 3/2003 | Rhoads |
| 6,546,556 | B1 | 4/2003 | Kataoka et al. |
| 6,553,178 | B2 | 4/2003 | Abecassis |
| 6,572,020 | B2 | 6/2003 | Barkan |
| 6,607,136 | B1 | 8/2003 | Atsmon et al. |
| 6,621,881 | B2 | 9/2003 | Srinivasan |
| 6,642,966 | B1 | 11/2003 | Limaye |
| 6,647,548 | B1 | 11/2003 | Lu et al. |
| 6,651,253 | B2 | 11/2003 | Dudkiewicz et al. |
| 6,654,480 | B2 | 11/2003 | Rhoads |
| 6,665,873 | B1 | 12/2003 | Van Gestel et al. |
| 6,675,383 | B1 | 1/2004 | Wheeler et al. |
| 6,681,209 | B1 | 1/2004 | Schmidt et al. |
| 6,683,966 | B1 | 1/2004 | Tian et al. |
| 6,710,815 | B1 | 3/2004 | Billmaier et al. |
| 6,714,683 | B1 | 3/2004 | Tian et al. |
| 6,741,684 | B2 | 5/2004 | Kaars |
| 6,750,985 | B2 | 6/2004 | Rhoads |
| 6,754,470 | B2 | 6/2004 | Hendrickson et al. |
| 6,766,523 | B2 | 7/2004 | Herley |
| 6,804,379 | B2 | 10/2004 | Rhoads |
| 6,804,566 | B1 | 10/2004 | Colomes et al. |
| 6,823,310 | B2 | 11/2004 | Ishito et al. |
| 6,829,368 | B2 | 12/2004 | Meyer et al. |
| 6,834,308 | B1 | 12/2004 | Ikezoye et al. |
| 6,845,360 | B2 | 1/2005 | Jensen et al. |
| 6,862,355 | B2 | 3/2005 | Kolessar et al. |
| 6,871,180 | B1 | 3/2005 | Neuhauser |
| 6,873,688 | B1 | 3/2005 | Aarnio |
| 6,941,275 | B1 | 9/2005 | Swierczek |
| 6,968,564 | B1 | 11/2005 | Srinivasan |
| 6,970,786 | B2 | 11/2005 | Hayama et al. |
| 6,970,886 | B1 | 11/2005 | Conwell et al. |
| 6,996,213 | B1 | 2/2006 | De Jong |
| 7,003,731 | B1 | 2/2006 | Rhoads et al. |
| 7,006,555 | B1 | 2/2006 | Srinivasan |

(56) References Cited

U.S. PATENT DOCUMENTS 7,012,565 B2 3/2006 Park et al.
7,050,603 B2 5/2006 Rhoads et al.
7,051,086 B2 5/2006 Rhoads et al.
7,058,697 B2 6/2006 Rhoads
7,082,434 B2 7/2006 Gosselin
7,095,871 B2 8/2006 Jones et al.
7,130,622 B2 10/2006 Vanska et al.
7,143,949 B1 12/2006 Hannigan
7,171,018 B2 1/2007 Rhoads et al.
7,174,293 B2 2/2007 Kenyon et al.
7,181,159 B2 2/2007 Breen
7,185,201 B2 2/2007 Rhoads et al.
7,194,752 B1 3/2007 Kenyon et al.
7,215,280 B1 5/2007 Percy et al.
7,221,405 B2 5/2007 Basson et al.
7,221,902 B2 5/2007 Kopra et al.
7,222,071 B2 5/2007 Neuhauser et al.
7,227,972 B2 6/2007 Brundage et al.
7,248,715 B2 7/2007 Levy
7,254,249 B2 8/2007 Rhoads et al.
7,260,221 B1 8/2007 Atsmon
7,273,978 B2 9/2007 Uhle
7,280,970 B2 10/2007 Tamir et al.
7,324,159 B2 1/2008 Eveleens et al.
7,328,153 B2 2/2008 Wells et al.
7,328,160 B2 2/2008 Nishio et al.
7,334,735 B1 2/2008 Antebi et al.
7,346,512 B2 3/2008 Li-Chun Wang et al.
7,356,700 B2 4/2008 Noridomi et al.
7,363,278 B2 4/2008 Schmelzer et al.
7,369,678 B2 5/2008 Rhoads
7,379,778 B2 5/2008 Hayes et al.
7,383,297 B1 6/2008 Atsmon et al.
7,421,723 B2 9/2008 Harkness et al.
7,437,475 B2 10/2008 Philyaw
7,440,674 B2 10/2008 Plotnick et al.
7,443,292 B2 10/2008 Jensen et al.
7,463,143 B2 12/2008 Forr et al.
7,486,925 B2 2/2009 Breen
7,500,007 B2 3/2009 Ikezoye et al.
7,516,074 B2 4/2009 Bilobrov
7,533,266 B2 5/2009 Bruekers et al.
7,577,195 B2 8/2009 Hickey, Jr.
7,587,732 B2 9/2009 Wright et al.
7,592,908 B2 9/2009 Zhang et al.
7,623,823 B2 11/2009 Zito et al.
7,639,599 B2 12/2009 Van Der Veen et al.
7,640,141 B2 12/2009 Kolessar et al.
7,672,843 B2 3/2010 Srinivasan
7,742,737 B2 6/2010 Peiffer et al.
7,757,248 B2 7/2010 Harkness et al.
7,783,489 B2 8/2010 Kenyon et al.
7,783,889 B2 8/2010 Srinivasan
7,788,684 B2 8/2010 Petrovic et al.
7,796,978 B2 9/2010 Jones et al.
7,870,574 B2 1/2011 Kenyon et al.
7,894,703 B2 2/2011 Lapstun et al.
7,908,133 B2 * 3/2011 Neuhauser .................... 704/203
7,917,645 B2 3/2011 Ikezoye et al.
7,941,480 B2 5/2011 Atsmon et al.
7,941,816 B2 5/2011 Harkness et al.
7,961,881 B2 6/2011 Jensen et al.
8,019,609 B2 9/2011 Tamir et al.
8,020,000 B2 9/2011 Oostveen et al.
8,069,037 B2 11/2011 Singhai
8,103,879 B2 1/2012 Levy et al.
8,121,830 B2 2/2012 Srinivasan et al.
8,359,205 B2 1/2013 Srinivasan et al.
8,369,972 B2 2/2013 Topchy et al.
8,666,528 B2 3/2014 Harkness et al.
8,707,340 B2 4/2014 Ramaswamy et al.
2001/0044899 A1 11/2001 Levy
2001/0048803 A1 12/2001 Imahashi et al.
2001/0053190 A1 12/2001 Srinivasan
2001/0056573 A1 12/2001 Kovac et al.
2002/0004740 A1 1/2002 Shotey et al.
2002/0032734 A1 3/2002 Rhoads
2002/0033842 A1 3/2002 Zetts
2002/0053078 A1 5/2002 Holtz et al.
2002/0056089 A1 5/2002 Houston
2002/0059218 A1 5/2002 August et al.
2002/0062382 A1 5/2002 Rhoads et al.
2002/0108125 A1 8/2002 Joao
2002/0111934 A1 8/2002 Narayan
2002/0112002 A1 8/2002 Abato
2002/0124246 A1 9/2002 Kaminsky et al.
2002/0126872 A1 9/2002 Brunk et al.
2002/0133393 A1 9/2002 Tatsumi et al.
2002/0133562 A1 9/2002 Newnam et al.
2002/0144262 A1 10/2002 Plotnick et al.
2002/0162118 A1 10/2002 Levy et al.
2002/0164050 A1 11/2002 Rhoads
2002/0174425 A1 11/2002 Markel et al.
2002/0194592 A1 12/2002 Tsuchida et al.
2003/0005430 A1 1/2003 Kolessar
2003/0021441 A1 1/2003 Levy et al.
2003/0039465 A1 2/2003 Bjorgan et al.
2003/0086341 A1 5/2003 Wells et al.
2003/0088674 A1 5/2003 Ullman et al.
2003/0103645 A1 6/2003 Levy et al.
2003/0105870 A1 6/2003 Baum
2003/0108200 A1 6/2003 Sako
2003/0110485 A1 6/2003 Lu et al.
2003/0131350 A1 7/2003 Peiffer et al.
2003/0170001 A1 9/2003 Breen
2003/0177488 A1 9/2003 Smith et al.
2003/0181168 A1 9/2003 Herrod et al.
2003/0195851 A1 10/2003 Ong
2003/0229900 A1 12/2003 Reisman
2004/0004630 A1 1/2004 Kalva et al.
2004/0006696 A1 1/2004 Shin et al.
2004/0008615 A1 1/2004 Oh
2004/0024588 A1 2/2004 Watson et al.
2004/0031058 A1 2/2004 Reisman
2004/0058675 A1 3/2004 Lu et al.
2004/0064319 A1 4/2004 Neuhauser et al.
2004/0073916 A1 4/2004 Petrovic et al.
2004/0102961 A1 5/2004 Jensen et al.
2004/0111738 A1 6/2004 Gunzinger
2004/0120417 A1 6/2004 Lynch et al.
2004/0122679 A1 * 6/2004 Neuhauser et al. ........... 704/500
2004/0122727 A1 6/2004 Zhang et al.
2004/0125125 A1 7/2004 Levy
2004/0127192 A1 7/2004 Ceresoli
2004/0128514 A1 7/2004 Rhoads
2004/0137929 A1 7/2004 Jones et al.
2004/0143844 A1 7/2004 Brant et al.
2004/0146161 A1 7/2004 De Jong
2004/0162720 A1 8/2004 Jang et al.
2004/0170381 A1 9/2004 Srinivasan
2004/0184369 A1 9/2004 Herre et al.
2004/0186768 A1 9/2004 Wakim et al.
2004/0199387 A1 10/2004 Wang et al.
2004/0210922 A1 * 10/2004 Peiffer et al. ..................... 725/9
2004/0236819 A1 11/2004 Anati et al.
2005/0028189 A1 2/2005 Heine et al.
2005/0033758 A1 2/2005 Baxter
2005/0035857 A1 2/2005 Zhang et al.
2005/0036653 A1 2/2005 Brundage et al.
2005/0050577 A1 3/2005 Westbrook
2005/0058319 A1 3/2005 Rhoads et al.
2005/0086488 A1 4/2005 Kori et al.
2005/0086682 A1 4/2005 Burges et al.
2005/0192933 A1 9/2005 Rhoads et al.
2005/0204379 A1 9/2005 Yamamori
2005/0234728 A1 10/2005 Tachibana et al.
2005/0234774 A1 10/2005 Dupree
2005/0243784 A1 11/2005 Fitzgerald et al.
2005/0262351 A1 11/2005 Levy
2005/0271246 A1 12/2005 Sharma et al.
2006/0059277 A1 3/2006 Zito et al.
2006/0083403 A1 4/2006 Zhang et al.
2006/0095401 A1 5/2006 Krikorian et al.
2006/0107195 A1 5/2006 Ramaswamy et al.

(56) References Cited

U.S. PATENT DOCUMENTS

| | | | |
|---|---|---|---|
| 2006/0107302 | A1 | 5/2006 | Zdepski |
| 2006/0110005 | A1 | 5/2006 | Tapson |
| 2006/0136564 | A1 | 6/2006 | Ambrose |
| 2006/0153041 | A1 | 7/2006 | Miyashita et al. |
| 2006/0168613 | A1 | 7/2006 | Wood et al. |
| 2006/0212290 | A1 | 9/2006 | Ide |
| 2006/0224798 | A1 | 10/2006 | Klein et al. |
| 2007/0006250 | A1 | 1/2007 | Cray et al. |
| 2007/0016918 | A1 | 1/2007 | Alcorn et al. |
| 2007/0055987 | A1 | 3/2007 | Lu et al. |
| 2007/0110089 | A1 | 5/2007 | Essafi et al. |
| 2007/0127717 | A1 | 6/2007 | Herre et al. |
| 2007/0129952 | A1 | 6/2007 | Kenyon et al. |
| 2007/0143778 | A1 | 6/2007 | Covell et al. |
| 2007/0149114 | A1 | 6/2007 | Danilenko |
| 2007/0162927 | A1 | 7/2007 | Ramaswamy et al. |
| 2007/0201835 | A1 | 8/2007 | Rhoads |
| 2007/0226760 | A1 | 9/2007 | Neuhauser et al. |
| 2007/0274523 | A1 | 11/2007 | Rhoads |
| 2007/0276925 | A1 | 11/2007 | La Joie et al. |
| 2007/0276926 | A1 | 11/2007 | LaJoie et al. |
| 2007/0288476 | A1 | 12/2007 | Flanagan, III et al. |
| 2007/0294057 | A1 | 12/2007 | Crystal et al. |
| 2007/0294132 | A1 | 12/2007 | Zhang et al. |
| 2007/0294705 | A1 | 12/2007 | Gopalakrishnan et al. |
| 2007/0294706 | A1 | 12/2007 | Neuhauser et al. |
| 2008/0019560 | A1 | 1/2008 | Rhoads |
| 2008/0022114 | A1 | 1/2008 | Moskowitz |
| 2008/0028223 | A1 | 1/2008 | Rhoads |
| 2008/0028474 | A1 | 1/2008 | Horne et al. |
| 2008/0040354 | A1 | 2/2008 | Ray et al. |
| 2008/0059160 | A1 | 3/2008 | Saunders et al. |
| 2008/0065507 | A1 | 3/2008 | Morrison et al. |
| 2008/0071530 | A1 | 3/2008 | Ehara |
| 2008/0077956 | A1 | 3/2008 | Morrison et al. |
| 2008/0082510 | A1 | 4/2008 | Wang et al. |
| 2008/0082922 | A1 | 4/2008 | Biniak et al. |
| 2008/0083003 | A1 | 4/2008 | Biniak et al. |
| 2008/0086304 | A1 | 4/2008 | Neuhauser |
| 2008/0101454 | A1 | 5/2008 | Luff et al. |
| 2008/0133223 | A1 | 6/2008 | Son et al. |
| 2008/0137749 | A1 | 6/2008 | Tian et al. |
| 2008/0139182 | A1 | 6/2008 | Levy et al. |
| 2008/0140573 | A1 | 6/2008 | Levy et al. |
| 2008/0215333 | A1 | 9/2008 | Tewfik et al. |
| 2008/0219496 | A1 | 9/2008 | Tewfik et al. |
| 2008/0235077 | A1 | 9/2008 | Harkness et al. |
| 2008/0292134 | A1 | 11/2008 | Sharma et al. |
| 2008/0319739 | A1 | 12/2008 | Mehrotra et al. |
| 2009/0030066 | A1 | 1/2009 | Kiss |
| 2009/0070587 | A1 | 3/2009 | Srinivasan et al. |
| 2009/0119723 | A1 | 5/2009 | Tinsman |
| 2009/0150553 | A1 | 6/2009 | Collart et al. |
| 2009/0193052 | A1 | 7/2009 | Fitzgerald |
| 2009/0240505 | A1 | 9/2009 | Villemoes et al. |
| 2009/0259325 | A1 | 10/2009 | Topchy et al. |
| 2009/0265214 | A1 | 10/2009 | Jobs et al. |
| 2009/0281815 | A1 | 11/2009 | Zopf |
| 2009/0307061 | A1 | 12/2009 | Monighetti et al. |
| 2009/0307084 | A1 | 12/2009 | Monighetti et al. |
| 2009/0326960 | A1 | 12/2009 | Breebaat |
| 2010/0027837 | A1 | 2/2010 | Levy et al. |
| 2010/0030838 | A1 | 2/2010 | Atsmon et al. |
| 2010/0106510 | A1 | 4/2010 | Topchy et al. |
| 2010/0106718 | A1 | 4/2010 | Topchy et al. |
| 2010/0134278 | A1 | 6/2010 | Srinivasan et al. |
| 2010/0135638 | A1 | 6/2010 | Mio |
| 2010/0223062 | A1 | 9/2010 | Srinivasan et al. |
| 2010/0226526 | A1 | 9/2010 | Modro et al. |
| 2010/0268573 | A1 | 10/2010 | Jain |
| 2010/0273433 | A1 | 10/2010 | Ozaki et al. |
| 2010/0324708 | A1 | 12/2010 | Ojanpera |
| 2011/0208515 | A1 | 8/2011 | Neuhauser |
| 2011/0208518 | A1* | 8/2011 | Holtel et al. .................. 704/226 |
| 2011/0224992 | A1 | 9/2011 | Chaoul |
| 2012/0101827 | A1 | 4/2012 | Topchy et al. |
| 2012/0203363 | A1 | 8/2012 | McKenna |
| 2012/0203559 | A1 | 8/2012 | McKenna et al. |
| 2013/0096706 | A1 | 4/2013 | Srinivasan et al. |
| 2013/0138231 | A1 | 5/2013 | McKenna et al. |

FOREIGN PATENT DOCUMENTS

| | | |
|---|---|---|
| BR | 0112901 | 6/2003 |
| BR | 0309598 | 2/2005 |
| CA | 2293957 | 7/2000 |
| CA | 2150539 | 11/2000 |
| CA | 2483104 | 11/2003 |
| CN | 1149366 | 5/1997 |
| CN | 1303547 | 7/2001 |
| CN | 1372682 | 10/2002 |
| CN | 1592906 | 3/2005 |
| CN | 1647160 | 7/2005 |
| EP | 275328 | 7/1988 |
| EP | 0713335 | 5/1996 |
| EP | 0769749 | 4/1997 |
| EP | 0883939 | 12/1998 |
| EP | 0887958 | 12/1998 |
| EP | 1026847 | 8/2000 |
| EP | 1213860 | 6/2002 |
| EP | 1049320 | 1/2003 |
| EP | 1349370 | 10/2003 |
| EP | 1453286 | 1/2004 |
| EP | 1463220 | 9/2004 |
| EP | 1307833 | 6/2006 |
| EP | 1745464 | 10/2007 |
| EP | 1504445 | 8/2008 |
| EP | 1340320 | 10/2008 |
| EP | 1019868 | 1/2009 |
| EP | 1249002 | 3/2011 |
| JP | 2000307530 | 11/2000 |
| JP | 2002521702 | 7/2002 |
| JP | 2002247610 | 8/2002 |
| JP | 2003208187 | 7/2003 |
| JP | 2003536113 | 12/2003 |
| JP | 2006154851 | 6/2006 |
| JP | 2007318745 | 12/2007 |
| WO | 9111062 | 7/1991 |
| WO | WO 91/11062 | 7/1991 |
| WO | 9512278 | 5/1995 |
| WO | WO 95/12278 | 9/1995 |
| WO | 9527349 | 10/1995 |
| WO | 9627264 | 9/1996 |
| WO | WO 96/27264 | 9/1996 |
| WO | 9702672 | 1/1997 |
| WO | 97/43736 | 11/1997 |
| WO | 9810539 | 3/1998 |
| WO | WO 98/10539 | 3/1998 |
| WO | WO 98/26529 | 6/1998 |
| WO | 9832251 | 7/1998 |
| WO | WO 98/32251 | 7/1998 |
| WO | 9959275 | 11/1999 |
| WO | WO 99/59275 | 11/1999 |
| WO | 0004662 | 1/2000 |
| WO | WO 00/04662 | 1/2000 |
| WO | 0019699 | 4/2000 |
| WO | 0072309 | 11/2000 |
| WO | WO 00/72309 | 11/2000 |
| WO | 0119088 | 3/2001 |
| WO | 0124027 | 4/2001 |
| WO | 0131497 | 5/2001 |
| WO | 01/52178 | 7/2001 |
| WO | 0153922 | 7/2001 |
| WO | 0199109 | 12/2001 |
| WO | 0211123 | 2/2002 |
| WO | 0217591 | 2/2002 |
| WO | 0227600 | 4/2002 |
| WO | 02/45273 | 6/2002 |
| WO | 02061652 | 8/2002 |
| WO | 02065318 | 8/2002 |
| WO | 03009277 | 1/2003 |
| WO | 03091990 | 11/2003 |
| WO | 03096337 | 11/2003 |
| WO | 2004010352 | 1/2004 |

(56) References Cited

FOREIGN PATENT DOCUMENTS

| | | |
|---|---|---|
| WO | 2004040416 | 5/2004 |
| WO | 2004040475 | 5/2004 |
| WO | 2005025217 | 3/2005 |
| WO | 2005038625 | 4/2005 |
| WO | 2005064885 | 7/2005 |
| WO | 2005101243 | 10/2005 |
| WO | 2005111998 | 11/2005 |
| WO | 2006012241 | 2/2006 |
| WO | 2006025797 | 3/2006 |
| WO | 2007056531 | 5/2007 |
| WO | 2007056532 | 5/2007 |
| WO | 2008042953 | 4/2008 |
| WO | 2008044664 | 4/2008 |
| WO | 2008045950 | 4/2008 |
| WO | 2008110002 | 9/2008 |
| WO | 2008110790 | 9/2008 |
| WO | 2009011206 | 1/2009 |
| WO | 2009061651 | 5/2009 |
| WO | 2009064561 | 5/2009 |

OTHER PUBLICATIONS

United States Patent and Trademark Office, "Non-Final Office Action," issued in connection with U.S. Appl. No. 10/256,834, on Jul. 6, 2004, 11 pages.

Fink et al. "Social-and Interactive-Television Applications Based on Real-Time Ambient-Audio Identification," EuroITV, 2006(10 pages).

Calburn, "Google Researchers Prose TB Monitoring," Information Week, Jun. 7, 2006, (3 pages).

Anderson, "Google to Compete with Nielsen for TV-Ratings Info?," Ars Technica, Jun. 19, 2006 (2 pages).

Wang, "An Industrial-Strength Audio Algorithm," Shazam Entertainment, Ltd., in Proceedings of the Fourth International Conference on Music Information Retrieval, Baltimore, Oct. 26-30, 2003 (7 pages).

Stultz, "Handheld Captioning at Disney World Theme Parks," article retrieved on Mar. 19, 2009, http://goflorida.about.com/od/disneyworld/a/wdw_captioning.htm, (2 pages).

Kane, "Entrepreneur Plans On-Demand Videogame Service," The Wall Street Journal, Mar. 24, 2009 (2 pages).

Shazam, "Shazam turns up the volume on mobile music," http://www.shazam.com/music/web/newsdetail.html? nid=NEWS137, Nov. 28, 2007 (1 page).

Shazam "Shazam and VidZone Digital Media announce UK1s first fixed price moble download service for music videos," http://www.shazam.com/music/web/newsdetail.html?nid=NEWS136, Feb. 11, 2008 (1 page).

Shazam, "Shazam launches new music application for Facebook fans," http://www.shazam.com/music/web/newsdetail.html?nid=NEWS135, Feb. 18, 2008 (1 page).

Heuer, et al. Adaptive Multimedia Messaging based on MPEG-7 the M3-Box, Nov. 9-10, 2000, Proc. Second Int'l Symposium on Mobile Multimedia System Application, pp. 6-13 (8 pages).

Wactlar et al.. "Digital Video Archives: Managing Through Metadata," Building a National Strategy for Digital Preservation: Issues in Digital Media-Archiving, Apr. 2002, pp. 84-88. http://www.informedia.cs.cmu.edu/documents/Wactlare-CLIR-final.pdf, retrieved on Jul. 20, 2006 (14 pages).

Mulder, "The Integration of Metadata From Production to Consumer," EBU Technical Review, Sep. 2000, pp. 1-5, http://www.ebu.ch/en/technical/trev/trev_284-contents.html, retrieved on Jul. 20, 2006 (5 pages).

Hopper, "EBU Project Group P/META Metadata Exchange Standards," EBU Technical Review, Sep. 2000, pp. 1-24, http://www.ebu.ch/en/technical/trev/trev_284-contents.html, retrieved on Jul. 20, 2006 (24 page).

Evain, "TV-Anytime Metadata-A Preliminary Specification on Schedule!," EBU Technical Review, Sep. 2000, pp. 1-14 http://www.ebu.ch/en/technical/trev/trev_284-contents.html, retrieved on Jul. 20, 2006 (14 pages).

"EBU Technical Review (Editorial)," No. 284, Sep. 2000, pp. 1-3, http://www.ebu.ch/en/technical/trev/trev_284-contents.html, retrieved on Jul. 20, 2006 (3 pages).

International Search Report and Written Opinion in International Application No. PCT/US2012/071972 dated Mar. 12, 2013.

International Search Report and Written Opinion in International Application No. PCT/US12/67062 dated Feb. 5, 2013.

Bob Patchen, Meters for the Digital Age, "An Update on Arbitron's Personal Portable Meter", TVB Research Conference, Oct. 14, 1999, pp. 1-29.

The Manchester 300, Out of the Lab and into the Field (A Report on the Extended Field Test of Arbitron's Portable People Meter in Manchester, England), 2000, pp. 1-23.

Stephen Kenyon and Laura Simkins, "High Capacity Real Time Broadcast Monitoring", Systems, Man and Cybernetics, 1991, IEEE Int'l Conf. on Decision Aiding for Complex Systems, vol. 1, Oct. 13-19, 1991, pp. 147-152.

Bob Patchen, Meters for the Digital Age, "An Update on Arbitron's Personal Portable Meter", TVB Research Conference, Oct. 14, 1999, (pp. 1-29).

The Manchester 300, "Out of the Lab and into the Field (A Report on the Extended Field Test of Arbitron's Portable People Meter in Manchester, England)", 2000, (pp. 1-23).

* cited by examiner

ACTIVATING FUNCTIONS IN PROCESSING DEVICES USING START CODES EMBEDDED IN AUDIO

RELATED APPLICATIONS

This patent arises from a continuation-in-part of U.S. non-provisional patent application Ser. No. 13/046,360, titled “System and Methods for Gathering Research Data”, filed Mar. 11, 2011, which is a continuation of U.S. non-provisional patent application Ser. No. 11/805,075, filed May 21, 2007, now U.S. Pat. No. 7,908,133 issued Mar. 15, 2011, which is a continuation-in-part of U.S. non-provisional patent application Ser. No. 10/256,834, filed Sep. 27, 2002, now U.S. Pat. No. 7,222,071 issued May 22, 2007. This patent also arises from a continuation-in-part of U.S. non-provisional patent application Ser. No. 13/307,649, titled “Apparatus, System and Method for Activating Functions in Processing Devices Using Encoded Audio,” filed Nov. 30, 2011. Each of U.S. patent application Ser. Nos. 13/046,360; 11/805,075; 10/256,834; and 13/307,649 is assigned to the assignee of the present application, and is hereby incorporated herein by reference in its entirety.

BACKGROUND INFORMATION

There is considerable interest in identifying and/or measuring the receipt of, and or exposure to, audio data by an audience in order to provide market information to advertisers, media distributors, and the like, to verify airing, to calculate royalties, to detect piracy, and for any other purposes for which an estimation of audience receipt or exposure is desired. Additionally, there is a considerable interest in providing content and/or performing actions on devices based on media exposure detection. The emergence of multiple, overlapping media distribution pathways, as well as the wide variety of available user systems (e.g. PC’s, PDA’s, portable CD players, Internet, appliances, TV, radio, etc.) for receiving audio data and other types of data, has greatly complicated the task of measuring audience receipt of, and exposure to, individual program segments. The development of commercially viable techniques for encoding audio data with program identification data provides a crucial tool for measuring audio data receipt and exposure across multiple media distribution pathways and user systems.

One such technique involves adding an ancillary code to the audio data that uniquely identifies the program signal. Most notable among these techniques is the CBET methodology developed by Arbitron Inc., which is already providing useful audience estimates to numerous media distributors and advertisers. An alternative technique for identifying program signals is extraction and subsequent pattern matching of “signatures” of the program signals. Such techniques typically involve the use of a reference signature database, which contains a reference signature for each program signal the receipt of which, and exposure to which, is to be measured. Before the program signal is broadcast, these reference signatures are created by measuring the values of certain features of the program signal and creating a feature set or “signature” from these values, commonly termed “signature extraction”, which is then stored in the database. Later, when the program signal is broadcast, signature extraction is again performed, and the signature obtained is compared to the reference signatures in the database until a match is found and the program signal is thereby identified.

However, one disadvantage of using such pattern matching techniques is that, because there is no predetermined point in the program signal from which signature extraction is designated to begin, each program signal must continually undergo signature extraction, and each of these many successive signatures extracted from a single program signal must be compared to each of the reference signatures in the database. This, of course, requires a tremendous amount of data processing, which, due to the ever increasing methods and amounts of audio data transmission, is becoming more and more economically impractical.

In order to address the problems accompanying continuous extraction and comparison of signals, which uses excessive computer processing and storage resources, it has been proposed to use a “start code” to trigger a signature extraction.

One such technique, which is disclosed in U.S. Pat. No. 4,230,990 to Lert, et al., proposes the introduction of a brief “cue” or “trigger” code into the audio data. According to Lert, et al. upon detection of this code, a signature is extracted from a portion of the signal preceding or subsequent to the code. This technique entails the use of a code having a short duration to avoid audibility but which contains sufficient information to indicate that the program signal is a signal of the type from which a signature should be extracted. The presence of this code indicates the precise point in the signal at which the signature is to be extracted, which is the same point in the signal from which a corresponding reference signature was extracted prior to broadcast, and thus, a signature need be extracted from the program signal only once. Therefore, only one signature for each program signal must be compared against the reference signatures in the database, thereby greatly reducing the amount of data processing and storage required.

One disadvantage of this technique, however, is that the presence of a code that triggers the extraction of a signature from a portion of the signal before or after the portion of the signal that has been encoded necessarily limits the amount of information that can be obtained for producing the signature, as the encoded portion itself may contain information useful for producing the signature, and moreover, may contain information required to measure the values of certain features, such as changes of certain properties or ratios over time, which might not be accurately measured when a temporal segment of the signal (i.e. the encoded portion) cannot be used.

Another disadvantage of this technique is that, because the trigger code is of short duration, the likelihood of its detection is reduced. One disadvantage of such short codes is the diminished probability of detection that may result when a signal is distorted or obscured, as is the case when program signals are broadcast in acoustic environments. In such environments, which often contain significant amounts of noise, the trigger code will often be overwhelmed by noise, and thus, not be detected. Yet another specific disadvantage of such short codes is the diminished probability of detection that may result when certain portions of a signal are unrecoverable, such as when burst errors occur during transmission or reproduction of encoded audio signals. Burst errors may appear as temporally contiguous segments of signal error. Such errors generally are unpredictable and substantially affect the content of an encoded audio signal. Burst errors typically arise from failure in a transmission channel or reproduction device due to external interferences, such as overlapping of signals from different transmission channels, an occurrence of system power spikes, an interruption in normal operations, an introduction of noise contamination (intentionally or otherwise), and the like. In a transmission system, such circumstances may cause a portion of the transmitted encoded audio signals to be entirely unreceivable or significantly altered.

Absent retransmission of the encoded audio signal, the affected portion of the encoded audio may be wholly unrecoverable, while in other instances, alterations to the encoded audio signal may render the embedded information signal undetectable.

In systems for acoustically reproducing audio signals recorded on media, a variety of factors may cause burst errors in the reproduced acoustic signal. Commonly, an irregularity in the recording media, caused by damage, obstruction, or wear, results in certain portions of recorded audio signals being irreproducible or significantly altered upon reproduction. Also, misalignment of, or interference with, the recording or reproducing mechanism relative to the recording medium can cause burst-type errors during an acoustic reproduction of recorded audio signals. Further, the acoustic limitations of a speaker as well as the acoustic characteristics of the listening environment may result in spatial irregularities in the distribution of acoustic energy. Such irregularities may cause burst errors to occur in received acoustic signals, interfering with recovery of the trigger code.

A further disadvantage of this technique is that reproduction of a single, short-lived code that triggers signature extraction does not reflect the receipt of a signal by any audience member who was exposed to part, or even most, of the signal if the audience member was not present at the precise point at which the portion of the signal containing the trigger code was broadcast. Regardless of what point in a signal such a code is placed, it would always be possible for audience members to be exposed to the signal for nearly half of the signal's duration without being exposed to the trigger code.

Yet another disadvantage of this technique is that a single code of short duration that triggers signature extraction does not provide any data reflecting the amount of time for which an audience member was exposed to the audio data. Such data may be desirable for many reasons, such as, for example, to determine the percentage of audience members who listen to the entirety of a particular commercial or to determine the level of exposure of certain portions of commercials broadcast at particular times of interest, such as, for example, the first half of the first commercial broadcast, or the last half of the last commercial broadcast, during a commercial break of a feature program. Still another disadvantage of this technique is that a single code that triggers signature extraction cannot mark "beginning" and "end" portions of a program segment, which may be desired, for example, to determine the time boundaries of the segment.

Accordingly, it is desired to (1) provide techniques for gathering data reflecting receipt of and/or exposure to audio data that require minimal processing and storage resources, (2) provide techniques for gathering data reflecting receipt of and/or exposure to audio data wherein the maximum possible amount of information in the audio data is available for use in creating a signature, (3) provide techniques for gathering data reflecting receipt of and/or exposure to audio data wherein a start code for triggering the extraction of a signature is easily detected, (4) provide techniques for gathering data reflecting receipt of and/or exposure to audio data wherein a start code for triggering the extraction of a signature can be detected in noisy environments, (5) provide techniques for gathering data reflecting receipt of and/or exposure to audio data wherein a start code for triggering the extraction of a signature can be detected when burst errors occur during the broadcast of the audio data, (6) provide techniques for gathering data reflecting receipt of and/or exposure to audio data wherein a start code for triggering the extraction of a signature can be detected even when an audience member is only present for part of the audio data's broadcast, (7) provide techniques for gathering data reflecting receipt of and/or exposure to audio data wherein the duration of an audience member's exposure to a program signal can be measured, (8) provide techniques for gathering data reflecting receipt of and/or exposure to audio data wherein the beginning and end of a program signal can be determined, (9), provide techniques for using code and/or signatures to trigger actions on a processing device, such as activating a web link, presenting a digital picture, executing or activating an application ("app"), and so on, and (10) provide data gathering techniques which are likely to be adaptable to future media distribution paths and user systems which are presently unknown.

SUMMARY

For this application, the following terms and definitions shall apply, both for the singular and plural forms of nouns and for all verb tenses:

The term "data" as used herein means any indicia, signals, marks, domains, symbols, symbol sets, representations, and any other physical form or forms representing information, whether permanent or temporary, whether visible, audible, acoustic, electric, magnetic, electromagnetic, or otherwise manifested. The term "data" as used to represent predetermined information in one physical form shall be deemed to encompass any and all representations of the same predetermined information in a different physical form or forms.

The term "audio data" as used herein means any data representing acoustic energy, including, but not limited to, audible sounds, regardless of the presence of any other data, or lack thereof, which accompanies, is appended to, is superimposed on, or is otherwise transmitted or able to be transmitted with the audio data.

The term "network" as used herein means networks of all kinds, including both intra-networks, such as a single-office network of computers, and inter-networks, such as the Internet, and is not limited to any particular such network.

The term "source identification code" as used herein means any data that is indicative of a source of audio data, including, but not limited to, (a) persons or entities that create, produce, distribute, reproduce, communicate, have a possessory interest in, or are otherwise associated with the audio data, or (b) locations, whether physical or virtual, from which data is communicated, either originally or as an intermediary, and whether the audio data is created therein or prior thereto.

The terms "audience" and "audience member" as used herein mean a person or persons, as the case may be, who access media data in any manner, whether alone or in one or more groups, whether in the same or various places, and whether at the same time or at various different times.

The term "processor" as used herein means data processing devices, apparatus, programs, circuits, systems, and subsystems, whether implemented in hardware, software, or both.

The terms "communicate" and "communicating" as used herein include both conveying data from a source to a destination, as well as delivering data to a communications medium, system or link to be conveyed to a destination. The term "communication" as used herein means the act of communicating or the data communicated, as appropriate.

The terms "coupled", "coupled to", and "coupled with" shall each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, or (c) a functional relationship in which the operation of any one or more of the relevant devices, apparatus, files, programs, media, components, networks, systems, subsystems, or means depends, in whole or in part, on the operation of any one or more others thereof.

The term "audience measurement" as used herein is understood in the general sense to mean techniques directed to determining and measuring media exposure, regardless of form, as it relates to individuals and/or groups of individuals from the general public. In some cases, reports are generated from the measurement; in other cases, no report is generated. Additionally, audience measurement includes the generation of data based on media exposure to allow audience interaction. By providing content or executing actions relating to media exposure, an additional level of sophistication may be introduced to traditional audience measurement systems, and further provide unique aspects of content delivery for users.

In accordance with one exemplary embodiment, a method is provided for gathering data reflecting receipt of and/or exposure to audio data. The method comprises receiving audio data to be monitored in a monitoring device, the audio data having a monitoring code indicating that the audio data is to be monitored; detecting the monitoring code; and, in response to detection of the monitoring code, producing signature data characterizing the audio data using at least a portion of the audio data containing the monitoring code.

In another exemplary embodiment, a method is disclosed for performing an action in a computer-processing device using data reflecting receipt of and/or exposure to audio data, where the method comprises the steps of receiving audio data to be monitored in a monitoring device, the audio data having a monitoring code indicating that the audio data is to be monitored; detecting the monitoring code; in response to detection of the monitoring code, producing signature data characterizing the audio data using at least a portion of the audio data containing the monitoring code; and directing the performance of the action based on at least one of the monitoring code and signature data.

In another exemplary embodiment, a computer-processing device configured to perform an action using data reflecting receipt of and/or exposure to audio data is disclosed, comprising an input device to receive audio data having a monitoring code indicating that the audio data is to be monitored; a detector to detect the monitoring code; and a processing apparatus to produce, in response to detection of the monitoring code, signature data characterizing the audio data using at least a portion of the audio data containing the monitoring code, wherein the processing apparatus is configured to direct the performance of the action in the device based on at least one of the monitoring code and signature data.

In yet another exemplary embodiment, a method is disclosed for performing an action in a computer-processing device using data reflecting receipt of and/or exposure to audio data, comprising: detecting monitoring code from received audio data, said monitoring code indicating that the audio data is to be monitored; producing signature data in response to detection of the monitoring code, said signature data characterizing the audio data using at least a portion of the audio data containing the monitoring code; and direct the performance of the action based on at least one of the monitoring code and signature data.

The invention and its particular features and advantages will become more apparent from the following detailed description considered with reference to the accompanying drawings, in which the same elements depicted in different drawing figures are assigned the same reference numerals.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Various embodiments of the present invention will be described herein below with reference to the accompanying drawings. In the following description, well-known functions or constructions are not described in detail since they would obscure the invention in unnecessary detail.

Figure 1:
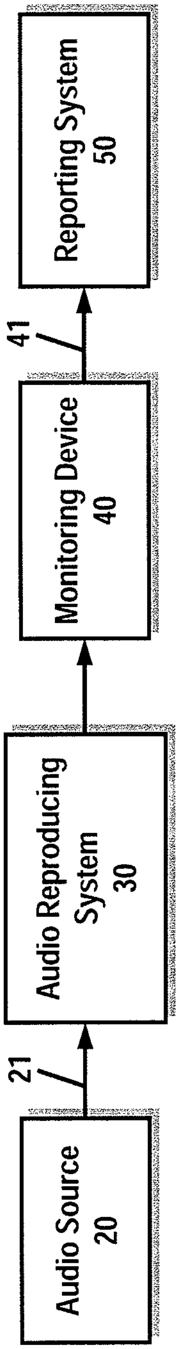
FIG. 1 is a functional block diagram for use in illustrating systems and methods for gathering data reflecting receipt and/or exposure to audio data in accordance with various embodiments.

FIG. 1 illustrates various embodiments of a system 16 including an implementation of the present invention for gathering data reflecting receipt of and/or exposure to audio data. The system 16 includes an audio source 20 that communicates audio data to an audio reproducing system 30.

While source 20 and system 30 are shown as separate boxes in FIG. 1, this illustration serves only to represent the path of the audio data, and not necessarily the physical arrangement of the devices. For example, the source 20 and the system 30 may be located either at a single location or at separate locations remote from each other. Further, the source 20 and the system 30 may be, or be located within, separate devices coupled to each other, either permanently or temporarily/intermittently, or one may be a peripheral of the other or of a device of which the other is a part, or both may be located within a single device, as will be further explained below.

The particular audio data to be monitored varies between particular embodiments and can include any audio data which may be reproduced as acoustic energy, the measurement of the receipt of which, or exposure to which, may be desired. In certain advantageous embodiments, the audio data represents commercials having an audio component, monitored, for example, in order to estimate audience exposure to commercials or to verify airing. In other embodiments, the audio data represents other types of programs having an audio component, including, but not limited to, television programs or movies, monitored, for example, in order to estimate audience exposure or verify their broadcast. In yet other embodiments, the audio data represents songs, monitored, for example, in order to calculate royalties or detect piracy. In still other embodiments, the audio data represents streaming media having an audio component, monitored, for example, in order to estimate audience exposure. In yet other embodiments, the audio data represents other types of audio files or audio/video files, monitored, for example, for any of the reasons discussed above.

The audio data 21 communicated from the audio source 20 to the system 30 includes a monitoring code, which code indicates that signature data is to be formed from at least a portion of the audio data relative to the monitoring code. The monitoring code is present in the audio data at the audio source 20 and is added to the audio data at the audio source 20 or prior thereto, such as, for example, in the recording studio or at any other time the audio is recorded or re-recorded (i.e. copied) prior to its communication from the audio source 20 to the system 30.

The monitoring code may be added to the audio data using any encoding technique suitable for encoding audio signals that are reproduced as acoustic energy, such as, for example, the techniques disclosed in U.S. Pat. No. 5,764,763 to Jensen, et al., and modifications thereto, which is assigned to the assignee of the present invention and which is incorporated herein by reference. Other appropriate encoding techniques are disclosed in U.S. Pat. No. 5,579,124 to Aijala, et al., U.S. Pat. Nos. 5,574,962, 5,581,800 and 5,787,334 to Fardeau, et al., U.S. Pat. No. 5,450,490 to Jensen, et al., and U.S. patent application Ser. No. 09/318,045, in the names of Neuhauser, et al., each of which is assigned to the assignee of the present application and all of which are incorporated herein by reference.

Still other suitable encoding techniques are the subject of PCT Publication WO 00/04662 to Srinivasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee, et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al, all of which are incorporated herein by reference.

In accordance with certain advantageous embodiments of the invention, this monitoring code occurs continuously throughout a time base of a program segment. In accordance with certain other advantageous embodiments of the invention, this monitoring code occurs repeatedly, either at a predetermined interval or at a variable interval or intervals. These types of encoded signals have certain advantages that may be desired, such as, for example, increasing the likelihood that a program segment will be identified when an audience member is only exposed to part of the program segment, or, further, determining the amount of time the audience member is actually exposed to the segment.

In another advantageous embodiment of the invention, two different monitoring codes occur in a program segment, the first of these codes occurring continuously or repeatedly throughout a first portion of a program segment, and the second of these codes occurring continuously or repeatedly throughout a second portion of the program segment. This type of encoded signal has certain advantages that may be desired, such as, for example, using the first and second codes as "start" and "end" codes of the program segment by defining the boundary between the first and second portions as the center, or some other predetermined point, of the program segment in order to determine the time boundaries of the segment.

In another advantageous embodiment of the invention, the audio data 21 communicated from the audio source 20 to the system 30 includes two (or more) different monitoring codes. This type of encoded data has certain advantages that may be desired, such as, for example, using the codes to identify two different program types in the same signal, such as a television commercial that is being broadcast along with a movie on a television, where it is desired to monitor exposure to both the movie and the commercial. Accordingly, in response to detection of each monitoring code, a signature is extracted from the audio data of the respective program.

In another advantageous embodiment, the audio data 21 communicated from the audio source 20 to the system 30 also includes a source identification code. The source identification code may include data identifying any individual source or group of sources of the audio data, which sources may include an original source or any subsequent source in a series of sources, whether the source is located at a remote location, is a storage medium, or is a source that is internal to, or a peripheral of, the system 30. In certain embodiments, the source identification code and the monitoring code are present simultaneously in the audio data 21, while in other embodiments they are present in different time segments of the audio data 21.

After the system 30 receives the audio data, in certain embodiments, the system 30 reproduces the audio data as acoustic audio data, and the system 16 further includes a monitoring device 40 that detects this acoustic audio data. In other embodiments, the system 30 communicates the audio data via a connection to monitoring device 40, or through other wireless means, such as RF, optical, magnetic and/or electrical means. While system 30 and monitoring device 40 are shown as separate boxes in FIG. 1, this illustration serves only to represent the path of the audio data, and not necessarily the physical arrangement of the devices. For example, the monitoring device 40 may be a peripheral of, or be located within, either as hardware or as software, the system 30, as will be further explained below.

After the audio data is received by the monitoring device 40, the audio data is processed until the monitoring code, with which the audio data has previously been encoded, is detected. In response to the detection of the monitoring code, the monitoring device 40 forms signature data 41 characterizing the audio data. In certain advantageous embodiments, the audio signature data 41 is formed from at least a portion of the program segment containing the monitoring code. This type of signature formation has certain advantages that may be desired, such as, for example, the ability to use the code as part of, or as part of the process for forming, the audio signature data, as well as the availability of other information contained in the encoded portion of the program segment for use in creating the signature data.

Suitable techniques for extracting signatures from audio data are disclosed in U.S. Pat. No. 5,612,729 to Ellis, et al. and in U.S. Pat. No. 4,739,398 to Thomas, et al., each of which is assigned to the assignee of the present invention and both of which are incorporated herein by reference. Still other suitable techniques are the subject of U.S. Pat. No. 2,662,168 to Scherbatsoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,531 to Kenyon, et al., U.S. Pat. No. 4,230,990 to Lert, et al., U.S. Pat. No. 5,594,934 to Lu, et al., and PCT publication WO91/11062 to Young, et al., all of which are incorporated herein by reference.

Specific methods for forming signature data include the techniques described below. It is appreciated that this is not an exhaustive list of the techniques that can be used to form signature data characterizing the audio data. In certain embodiments, the audio signature data 41 is formed by using variations in the received audio data. For example, in some of these embodiments, the signature 41 is formed by forming a signature data set reflecting time-domain variations of the received audio data, which set, in some embodiments, reflects such variations of the received audio data in a plurality of frequency sub-bands of the received audio data. In others of these embodiments, the signature 41 is formed by forming a signature data set reflecting frequency-domain variations of the received audio data.

In certain other embodiments, the audio signature data 41 is formed by using signal-to-noise ratios that are processed for a plurality of predetermined frequency components of the audio data and/or data representing characteristics of the audio data. For example, in some of these embodiments, the signature 41 is formed by forming a signature data set comprising at least some of the signal-to-noise ratios. In others of these embodiments, the signature 41 is formed by combining selected ones of the signal-to-noise ratios. In still others of these embodiments, the signature 41 is formed by forming a signature data set reflecting time-domain variations of the signal-to-noise ratios, which set, in some embodiments, reflects such variations of the signal-to-noise ratios in a plurality of frequency sub-bands of the received audio data, which, in some such embodiments, are substantially single frequency sub-bands. In still others of these embodiments, the signature 41 is formed by forming a signature data set reflecting frequency-domain variations of the signal-to-noise ratios.

In certain other embodiments, the signature data 41 is obtained at least in part from the monitoring code and/or from a different code in the audio data, such as a source identification code. In certain of such embodiments, the code comprises a plurality of code components reflecting characteristics of the audio data and the audio data is processed to recover the plurality of code components. Such embodiments are particularly useful where the magnitudes of the code components are selected to achieve masking by predetermined portions of the audio data. Such component magnitudes therefore, reflect predetermined characteristics of the audio data, so that the component magnitudes may be used to form a signature identifying the audio data.

In some of these embodiments, the signature 41 is formed as a signature data set comprising at least some of the recovered plurality of code components. In others of these embodiments, the signature 41 is formed by combining selected ones of the recovered plurality of code components. In yet other embodiments, the signature 41 can be formed using signal-to-noise ratios processed for the plurality of code components in any of the ways described above. In still further embodiments, the code is used to identify predetermined portions of the audio data, which are then used to produce the signature using any of the techniques described above. It will be appreciated that other methods of forming signatures may be employed.

After the signature data 41 is formed in the monitoring device 40, it is communicated to a reporting system 50, which processes the signature data to produce data representing the identity of the program segment. While monitoring device 40 and reporting system 50 are shown as separate boxes in FIG. 1, this illustration serves only to represent the path of the audio data and derived values, and not necessarily the physical arrangement of the devices. For example, the reporting system 50 may be located at the same location as, either permanently or temporarily/intermittently, or at a location remote from, the monitoring device 40. Further, the monitoring device 40 and the reporting system 50 may be, or be located within, separate devices coupled to each other, either permanently or temporarily/intermittently, or one may be a peripheral of the other or of a device of which the other is a part, or both may be located within, or implemented by, a single device.

Figure 2:
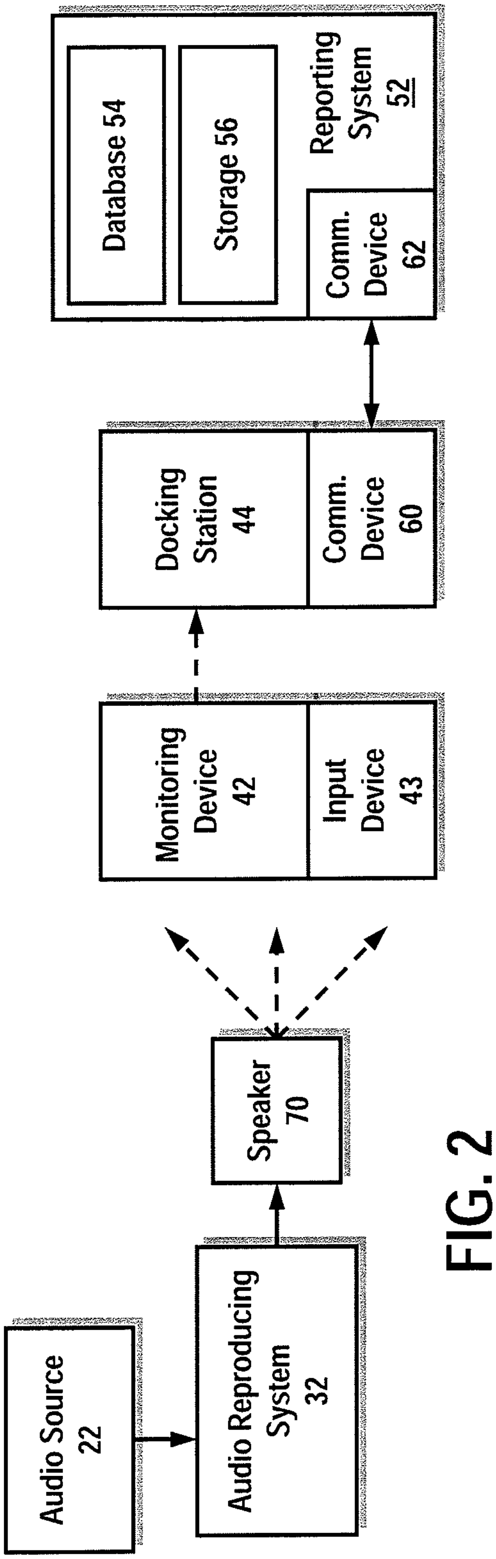
FIG. 2 is a functional block diagram for use in illustrating certain embodiments of the present disclosure.

As shown in FIG. 2, which illustrates certain advantageous embodiments of the system 16, the audio source 22 may be any external source capable of communicating audio data, including, but not limited to, a radio station, a television station, or a network, including, but not limited to, the Internet, a WAN (Wide Area Network), a LAN (Local Area Network), a PSTN (public switched telephone network), a cable television system, or a satellite communications system. The audio reproducing system 32 may be any device capable of reproducing audio data from any of the audio sources referenced above, including, but not limited to, a radio, a television, a stereo system, a home theater system, an audio system in a commercial establishment or public area, a personal computer, a web appliance, a gaming console, a cell phone, a pager, a PDA (Personal Digital Assistant), an MP3 player, any other device for playing digital audio files, or any other device for reproducing prerecorded media. The system 32 causes the audio data received to be reproduced as acoustic energy. The system 32 typically includes a speaker 70 for reproducing the audio data as acoustic audio data. While the speaker 70 may form an integral part of the system 32, it may also, as shown in FIG. 2, be a peripheral of the system 32, including, but not limited to, stand-alone speakers or headphones.

In certain embodiments, the acoustic audio data is received by a transducer, illustrated by input device 43 of monitoring device 42, for producing electrical audio data from the received acoustic audio data. While the input device 43 typically is a microphone that receives the acoustic energy, the input device 43 can be any device capable of detecting energy associated with the speaker 70, such as, for example, a magnetic pickup for sensing magnetic fields, a capacitive pickup for sensing electric fields, or an antenna or optical sensor for electromagnetic energy. In other embodiments, however, the input device 43 comprises an electrical or optical connection with the system 32 for detecting the audio data.

In certain advantageous embodiments, the monitoring device 42 is a portable monitoring device, such as, for example, a portable people meter. In these embodiments, the portable device 42 is carried by an audience member in order to detect audio data to which the audience member is exposed. In some of these embodiments, the portable device 42 is later coupled with a docking station 44, which includes or is coupled to a communications device 60, in order to communicate data to, or receive data from, at least one remotely located communications device 62.

The communications device 60 is, or includes, any device capable of performing any necessary transformations of the data to be communicated, and/or communicating/receiving the data to be communicated, to or from at least one remotely located communications device 62 via a communication system, link, or medium. Such a communications device may be, for example, a modem or network card that transforms the data into a format appropriate for communication via a telephone network, a cable television system, the Internet, a WAN, a LAN, or a wireless communications system. In embodiments that communicate the data wirelessly, the communications device 60 includes an appropriate transmitter, such as, for example, a cellular telephone transmitter, a wireless Internet transmission unit, an optical transmitter, an acoustic transmitter, or a satellite communications transmitter. In certain advantageous embodiments, the reporting system 52 has a database 54 containing reference audio signature data of identified audio data. After audio signature data is formed in the monitoring device 42, it is compared with the reference audio signature data contained in the database 54 in order to identify the received audio data.

There are numerous advantageous and suitable techniques for carrying out a pattern matching process to identify the audio data based on the audio signature data. Some of these techniques are disclosed in U.S. Pat. No. 5,612,729 to Ellis, et al. and in U.S. Pat. No. 4,739,398 to Thomas, et al., each of which is assigned to the assignee of the present invention and both of which are incorporated herein by reference. Still other suitable techniques are the subject of U.S. Pat. No. 2,662,168 to Scherbatsoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,531 to Kenyon, et al., U.S. Pat. No. 4,230,990 to Lert, et al., U.S. Pat. No. 5,594,934 to Lu et al., and PCT Publication WO91/11062 to Young et al., all of which are incorporated herein by reference.

In certain embodiments, the signature is communicated to a reporting system 52 having a reference signature database 54, and pattern matching is carried out by the reporting system 52 to identify the audio data. In other embodiments, the reference signatures are retrieved from the reference signature database 54 by the monitoring device 42 or the docking station 44, and pattern matching is carried out in the monitoring device 42 or the docking station 44. In the latter embodiments, the reference signatures in the database can be communicated to the monitoring device 42 or the docking station 44 at any time, such as, for example, continuously, periodically, when a monitoring device 42 is coupled to a docking station 44 thereof, when an audience member actively requests such a communication, or prior to initial use of the monitoring device 42 by an audience member.

After the audio signature data is formed and/or after pattern matching has been carried out, the audio signature data, or, if pattern matching has occurred, the identity of the audio data, is stored on a storage device 56 located in the reporting system. In certain embodiments, the reporting system 52 contains only a storage device 56 for storing the audio signature data. In other embodiments, the reporting system 52 is a single device containing both a reference signature database 54, a pattern matching subsystem (not shown for purposes of simplicity and clarity) and the storage device 56.

Figure 3:
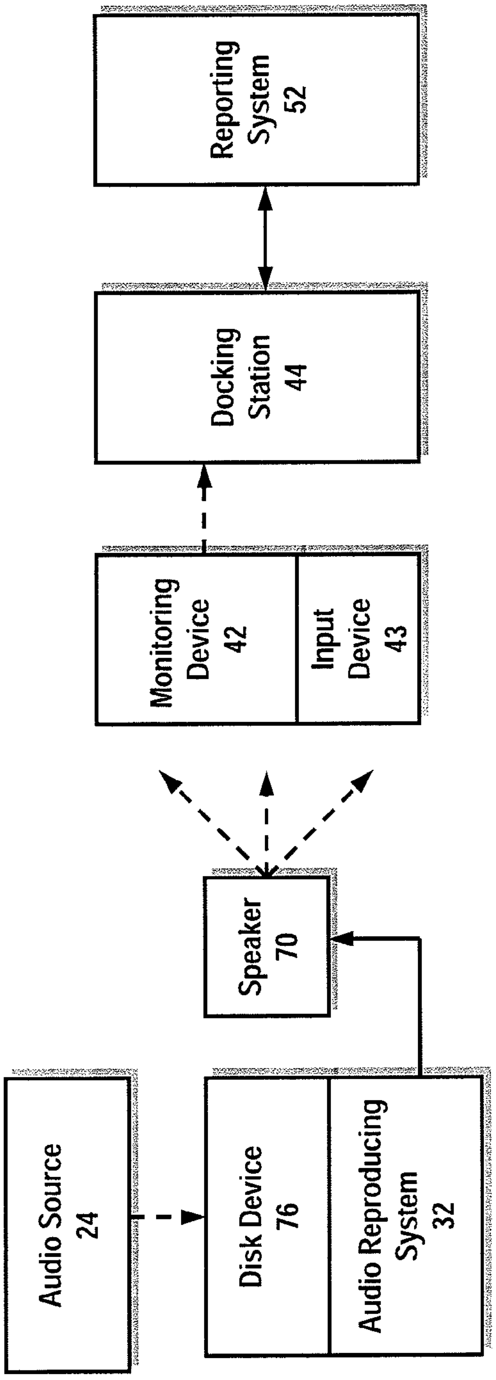
FIG. 3 is a functional block diagram for use in illustrating further embodiments of the present disclosure.
Figure 4:
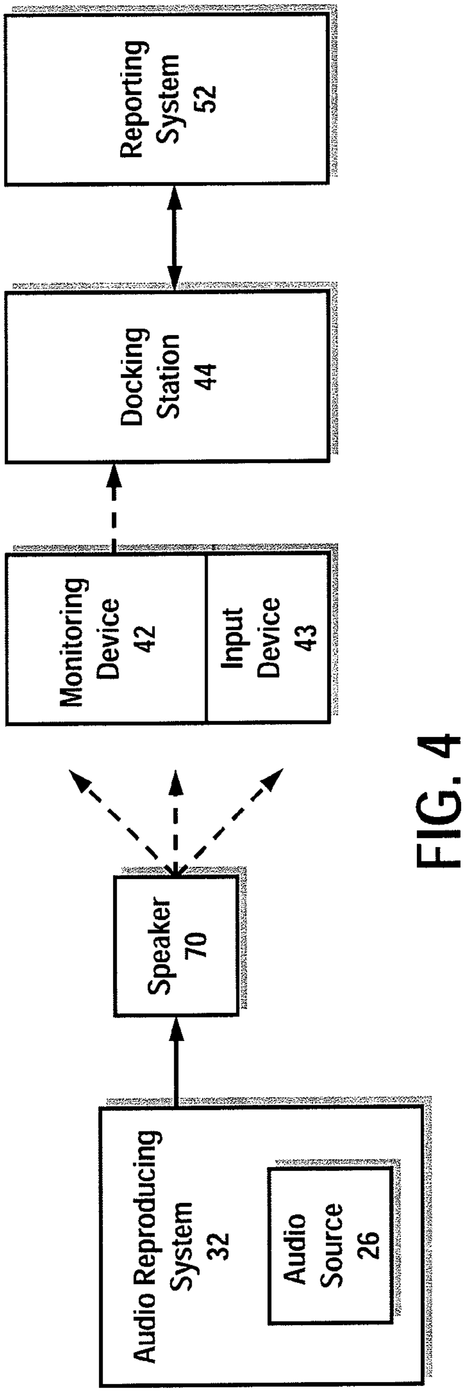
FIG. 4 is a functional block diagram for use in illustrating still further embodiments of the present disclosure.

Referring to FIG. 3, in certain embodiments, the audio source 24 is a data storage medium containing audio data previously recorded, including, but not limited to, a diskette, game cartridge, compact disc, digital versatile disk, or magnetic tape cassette, including, but not limited to, audiotapes, videotapes, or DATs (Digital Audio Tapes). Audio data from the source 24 is read by a disk drive 76 or other appropriate device and reproduced as sound by the system 32 by means of speaker 70. In yet other embodiments, as illustrated in FIG. 4, the audio source 26 is located in the system 32, either as hardware forming an integral part or peripheral of the system 32, or as software, such as, for example, in the case where the system 32 is a personal computer, a prerecorded advertisement included as part of a software program that comes bundled with the computer.

Figure 5:
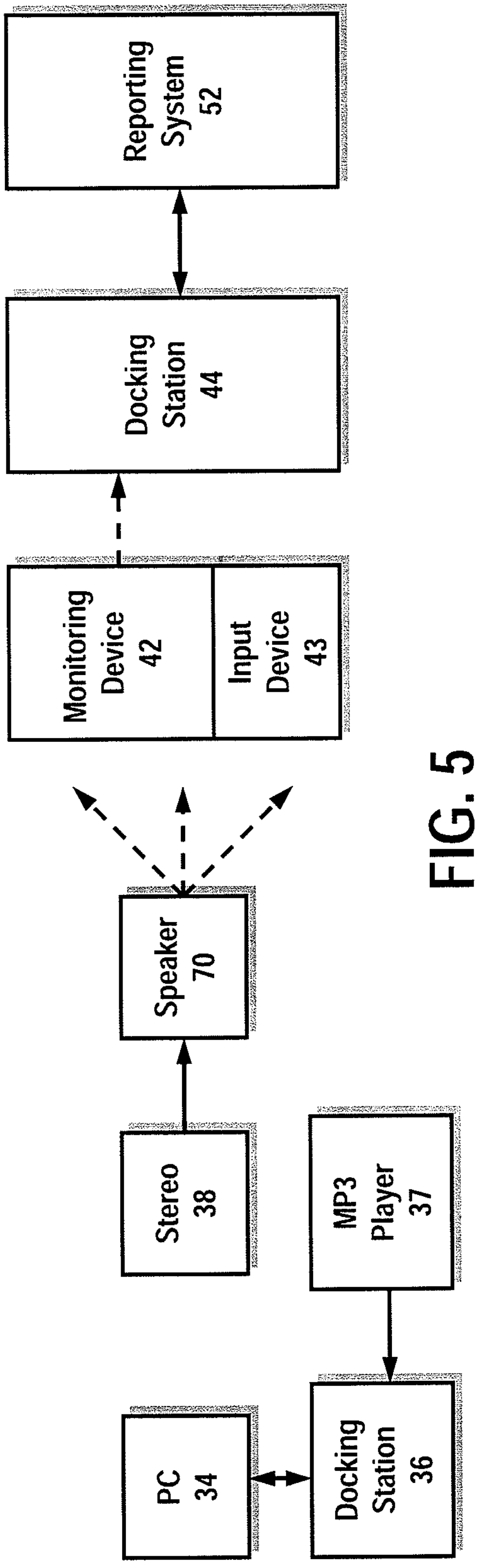
FIG. 5 is a functional block diagram for use in illustrating yet still further embodiments of the present disclosure.
Figure 6:
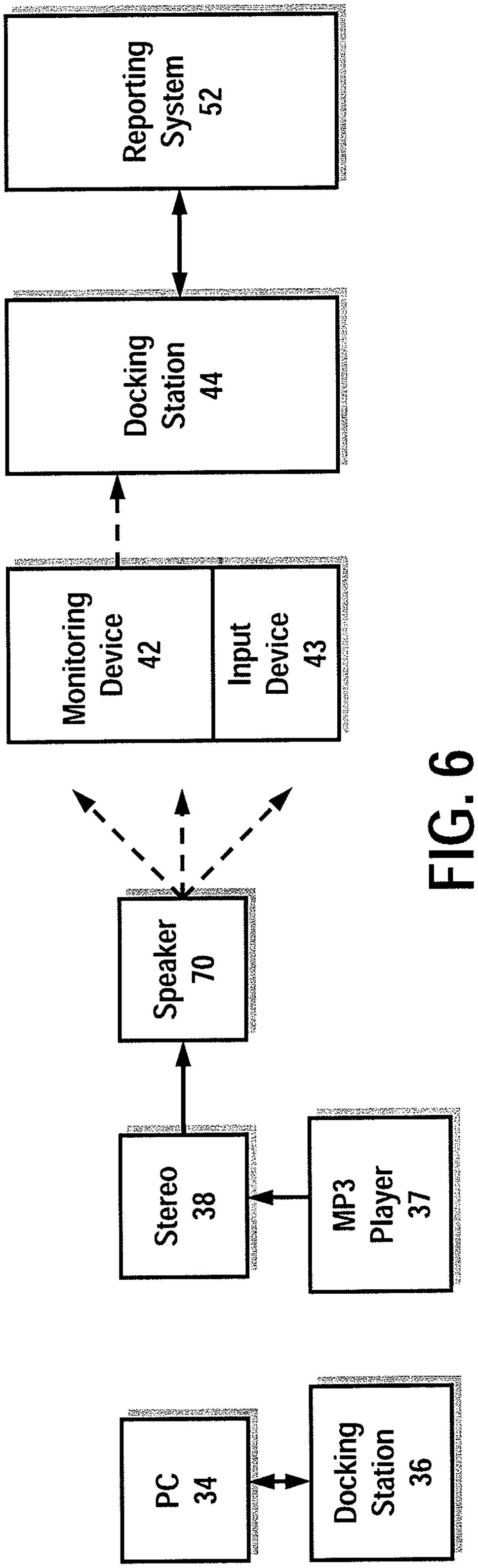
FIG. 6 is a functional block diagram for use in illustrating further embodiments of the present disclosure.

In still further embodiments, the source is another audio reproducing system, as defined below, such that a plurality of audio reproducing systems receive and communicate audio data in succession. Each system in such a series of systems may be coupled either directly or indirectly to the system located before or after it, and such coupling may occur, permanently, temporarily, or intermittently, as illustrated stepwise in FIGS. 5-6. Such an arrangement of indirect, intermittent couplings of systems may, for example, take the form of a personal computer 34, electrically coupled to an MP3 player docking station 36. As shown in FIG. 5, an MP3 player 37 may be inserted into the docking station 36 in order to transfer audio data from the personal computer 34 to the MP3 player 37. At a later time, as shown in FIG. 6, the MP3 player 37 may be removed from the docking station 36 and be electrically connected to a stereo 38.

Figure 7:
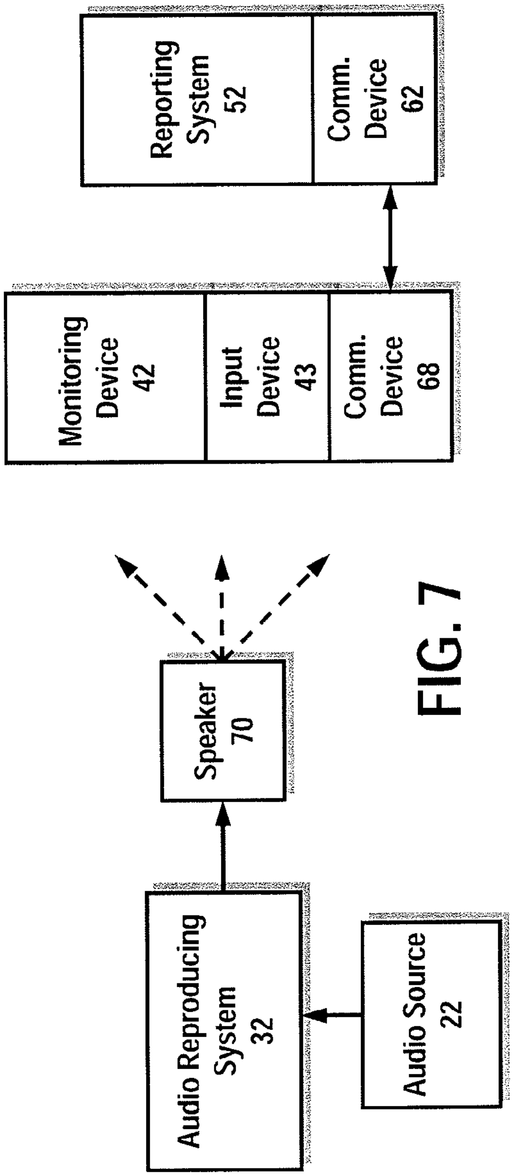
FIG. 7 is a functional block diagram for use in illustrating still further embodiments of the present disclosure.
Figure 8:
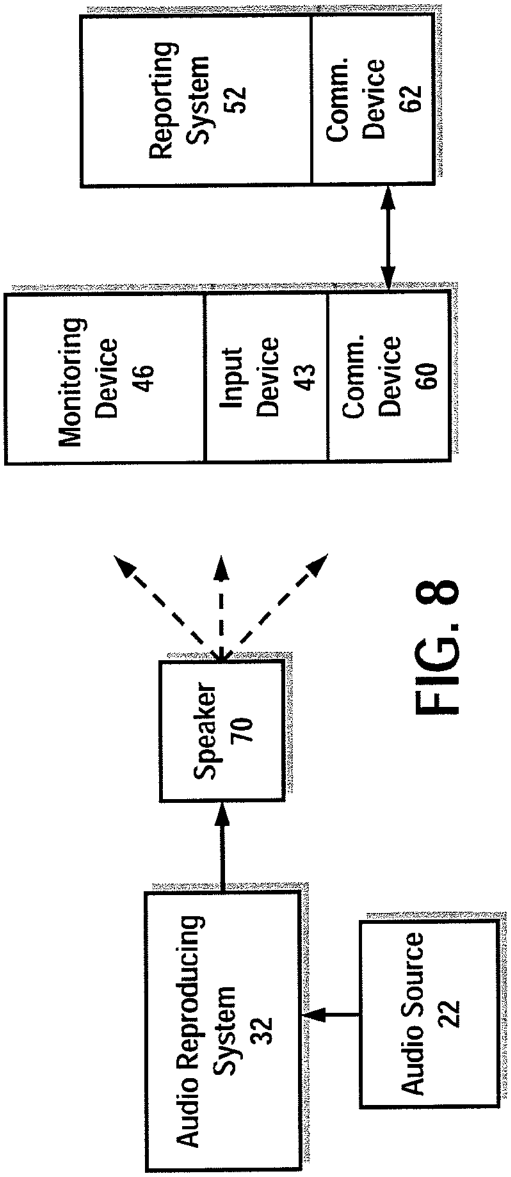
FIG. 8 is a functional block diagram for use in illustrating additional embodiments of the present disclosure.
Figure 9:
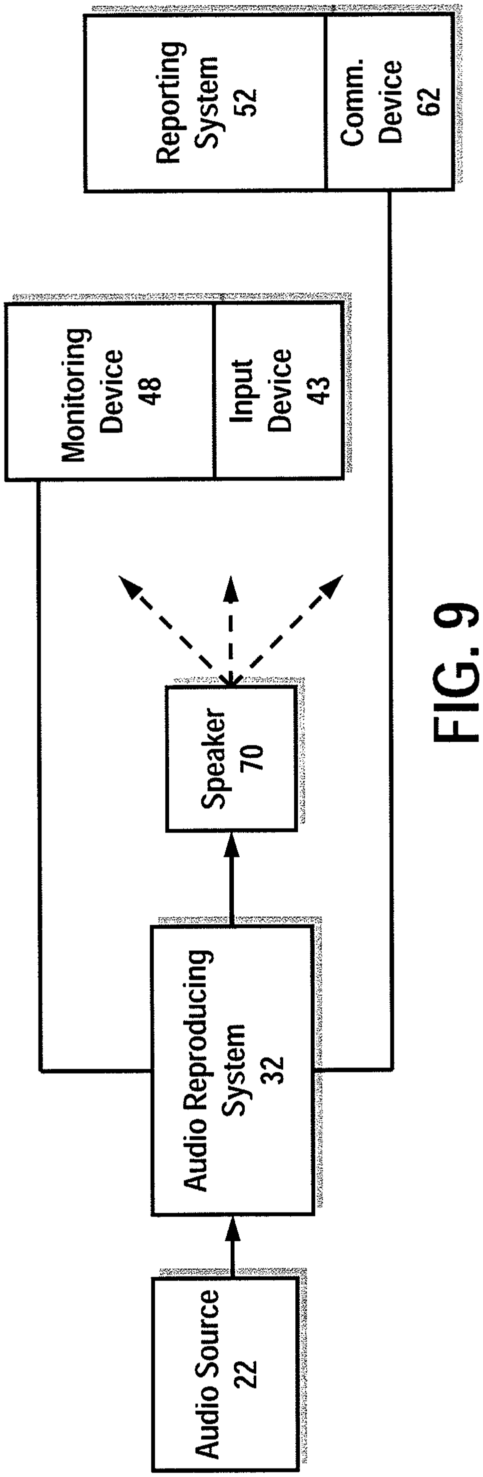
FIG. 9 is a functional block diagram for use in illustrating further additional embodiments of the present disclosure.

Referring to FIG. 7, in certain embodiments, the portable device 42 itself includes or is coupled to a communications device 68, in order to communicate data to, or receive data from, at least one remotely located communications device 62. In certain other embodiments, as illustrated in FIG. 8, the monitoring device 46 is a stationary monitoring device that is positioned near the system 32. In these embodiments, while a separate communications device for communicating data to, or receiving data from, at least one remotely located communications device 62 may be coupled to the monitoring device 46, the communications device 60 will typically be contained within the monitoring device 46. In still other embodiments, as illustrated in FIG. 9, the monitoring device 48 is a peripheral of the system 32. In these embodiments, the data to be communicated to or from at least one remotely located communications device 62 is communicated from the monitoring device 48 to the system 32, which in turn communicates the data to, or receives the data from, the remotely located communications device 62 via a communication system, link or medium.

Figure 10:
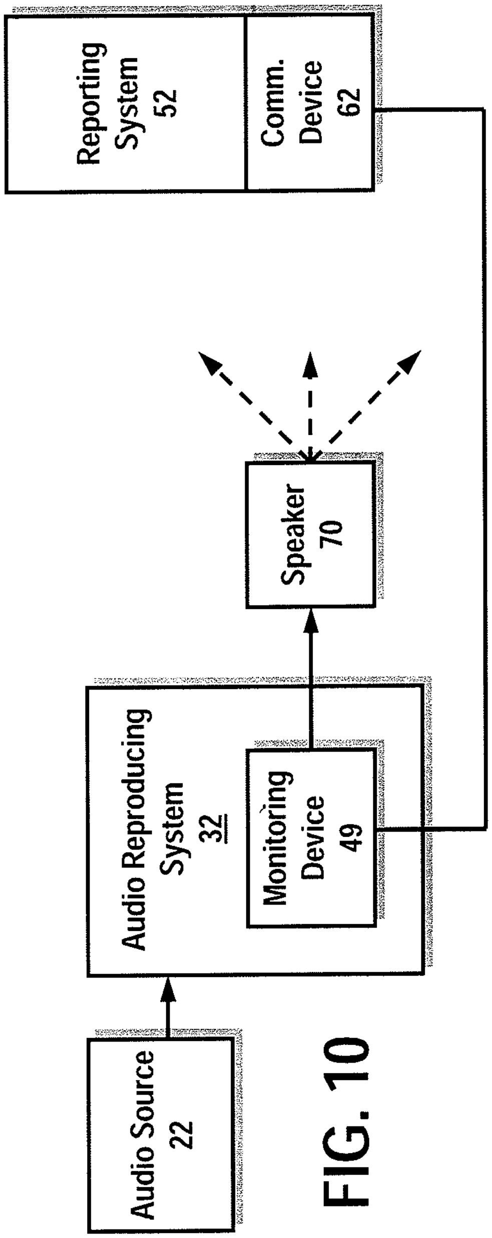
FIG. 10 is a functional block diagram for use in illustrating still further additional embodiments of the present disclosure.
Figure 11:
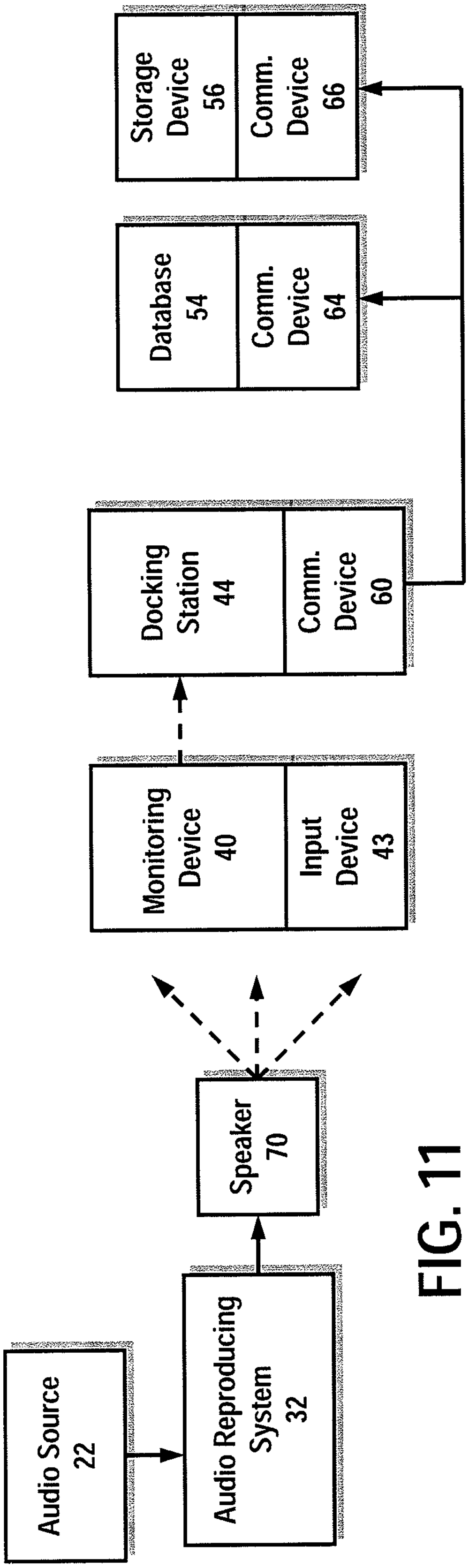
FIG. 11 is a functional block diagram for use in illustrating yet further additional embodiments of the present disclosure.
Figure 12:
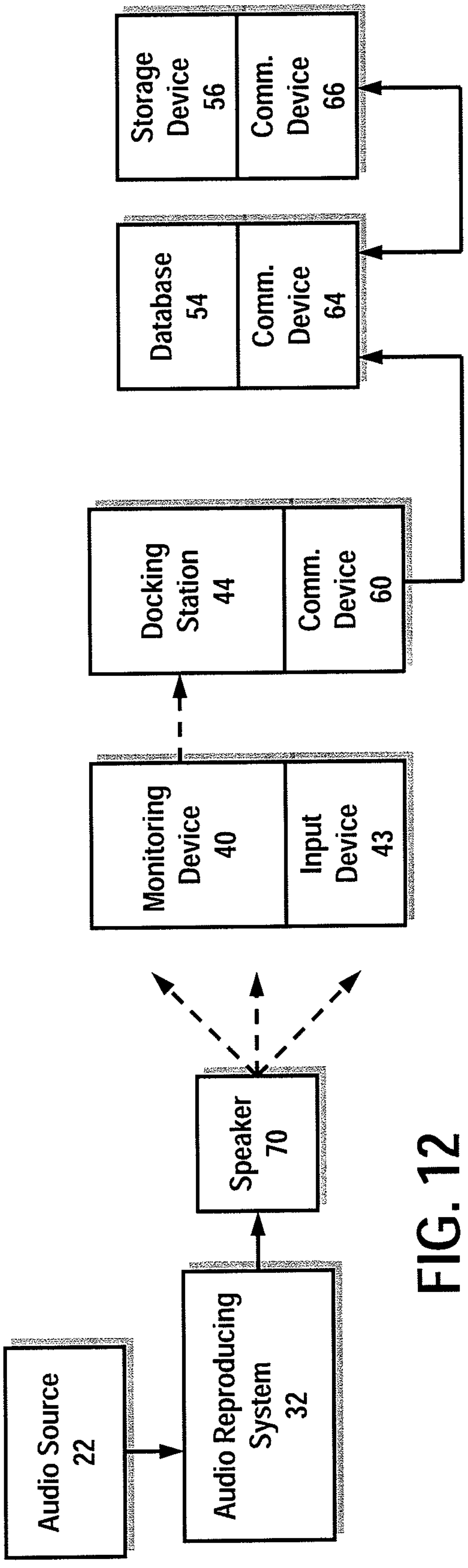
FIG. 12 is a functional block diagram for use in illustrating additional embodiments of the present disclosure.

In still further embodiments, as illustrated in FIG. 10, the monitoring device 49 is embodied in monitoring software operating in the system 32. In these embodiments, the system 32 communicates the data to be communicated to, or receives the data from, the remotely located communications device 62. Referring to FIG. 11, in certain embodiments, a reporting system comprises a database 54 and storage device 56 that are separate devices, which may be coupled to, proximate to, or located remotely from, each other, and which include communications devices 64 and 66, respectively, for communicating data to or receiving data from communications device 60. In embodiments where pattern matching occurs, data resulting from such matching may be communicated to the storage device 56 either by the monitoring device 40 or a docking station 44 thereof, as shown in FIG. 11, or by the reference signature database 54 directly therefrom, as shown in FIG. 12.

Figure 13:
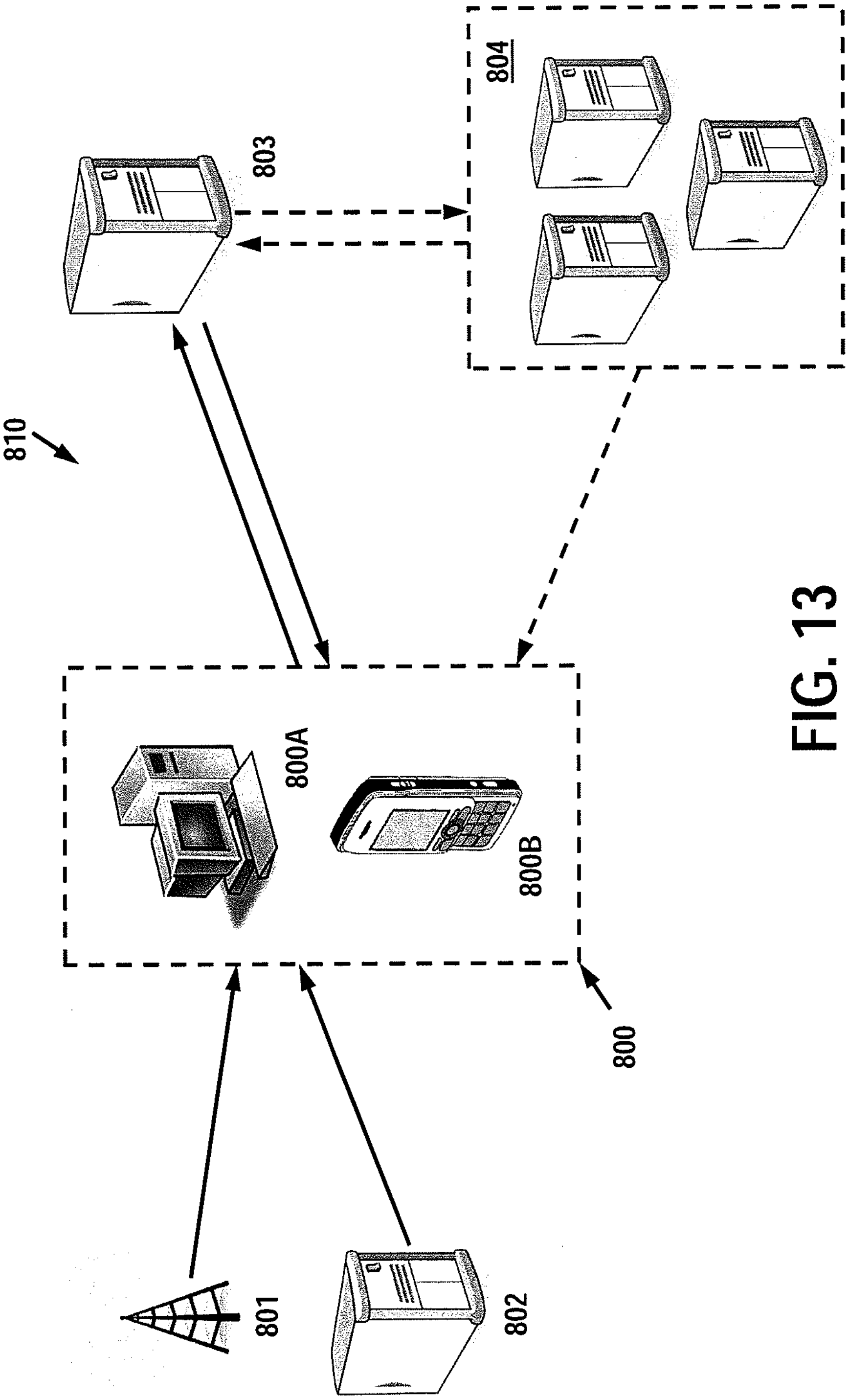
FIG. 13 Illustrates an example system in which a user device may receive media received from a broadcast source and/or a networked source.

FIG. 13 illustrates an exemplary system 810 where a user device 800 may receive media received from a broadcast source 801 and/or a networked source 802. It is understood that other media formats are contemplated in this disclosure as well, including over-the-air, cable, satellite, network, internetwork (including the Internet), distributed on storage media, or by any other means or technique that is humanly perceptible, without regard to the form or content of such data, and including but not limited to audio, video, audio/video, text, images, animations, databases, broadcasts, and streaming media data. With regard to device 800, the example of FIG. 8 shows that the device 800 can be in the form of a stationary device 800A, such as a personal computer, and/or a portable device 800B, such as a cell phone (or laptop, tablet, etc.). Device 800 is communicatively coupled to server 803 via wired or wireless network. Server 803 may be communicatively coupled via wired or wireless connection to one or more additional servers 804, which may further communicate back to device 800.

As will be explained in further details below, device 800 captures ambient encoded audio through a microphone (not shown), preferably built in to device 800, and/or receives audio through a wired or wireless connection (e.g., 802.11g, 802.11n, Bluetooth, etc.). The audio received in device may or may not be encoded. If encoded audio is received, it is decoded and a concurrent audio signature is formed using any of the techniques described above. After the encoded audio is decoded, one or more messages are detected and one or more signatures are extracted. Each message and/or signature may then used to trigger an action on device 800. Depending on the signature and/or content of the message(s), the process may result in the device (1) displaying an image, (2) displaying text, (2) displaying an HTML page, (3) playing video and/or audio, (4) executing software or a script, or any other similar function. The image may be a pre-stored digital image of any kind (e.g., JPEG) and may also be barcodes, QR Codes, and/or symbols for use with code readers found in kiosks, retail checkouts and security checkpoints in private and public locations. Additionally, the message or signature may trigger device 800 to connect to server 803, which would allow server 803 to provide data and information back to device 800, and/or connect to additional servers 804 in order to request and/or instruct them to provide data and information back to device 800.

In certain embodiments, a link, such as an IP address or Universal Resource Locator (URL), may be used as one of the messages. Under a preferred embodiment, shortened links may be used in order to reduce the size of the message and thus provide more efficient transmission. Using techniques such as URL shortening or redirection, this can be readily accomplished. In URL shortening, every "long" URL is associated with a unique key, which is the part after the top-level domain name. The redirection instruction sent to a browser can contain in its header the HTTP status 301 (permanent redirect) or 302 (temporary redirect). There are several techniques that may be used to implement a URL shortening. Keys can be generated in base 36, assuming 26 letters and 10 numbers. Alternatively, if uppercase and lowercase letters are differentiated, then each character can represent a single digit within a number of base 62. In order to form the key, a hash function can be made, or a random number generated so that key sequence is not predictable. The advantage of URL shortening is that most protocols are capable of being shortened (e.g., HTTP, HTTPS, FTP, FTPS, MMS, POP, etc.).

Figure 14:
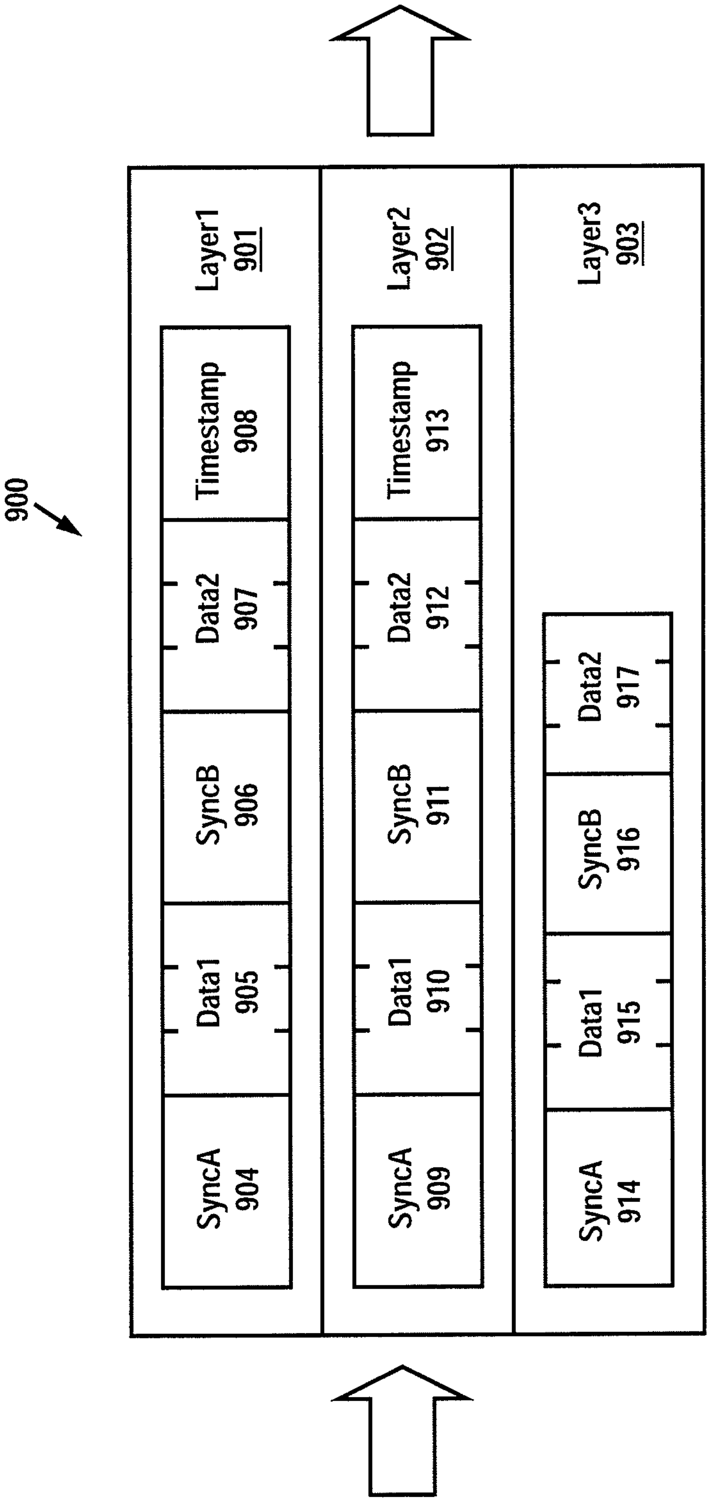
FIG. 14 Illustrates an example message that may be embedded/encoded into an audio signal.

With regard to encoded audio, FIG. 14 illustrates a message 900 that may be embedded/encoded into an audio signal. In this embodiment, message 900 includes three layers that are inserted by encoders in a parallel format. Suitable encoding techniques are disclosed in U.S. Pat. No. 6,871,180, titled "Decoding of Information in Audio Signals," issued Mar. 22, 2005, which is assigned to the assignee of the present application, and is incorporated by reference in its entirety herein. Other suitable techniques for encoding data in audio data are disclosed in U.S. Pat. No. 7,640,141 to Ronald S. Kolessar and U.S. Pat. No. 5,764,763 to James M. Jensen, et al., which are also assigned to the assignee of the present application, and which are incorporated by reference in their entirety herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., and U.S. Pat. No. 5,450,490 to Jensen, et al., each of which is assigned to the assignee of the present application and all of which are incorporated herein by reference in their entirety.

When utilizing a multi-layered message, one, two or three layers may be present in an encoded data stream, and each layer may be used to convey different data. Turning to FIG. 14, message 900 includes a first layer 901 containing a message comprising multiple message symbols. During the encoding process, a predefined set of audio tones (e.g., ten) or single frequency code components are added to the audio signal during a time slot for a respective message symbol. At the end of each message symbol time slot, a new set of code components is added to the audio signal to represent a new message symbol in the next message symbol time slot. At the end of such new time slot another set of code components may be added to the audio signal to represent still another message symbol, and so on during portions of the audio signal that are able to psychoacoustically mask the code components so they are inaudible. Preferably, the symbols of each message layer are selected from a unique symbol set. In layer 901, each symbol set includes two synchronization symbols (also referred to as marker symbols) 904, 906, a larger number of data symbols 905, 907, and time code symbols 908. Time code symbols 908 and data symbols 905, 907 are preferably configured as multiple-symbol groups.

The second layer 902 of message 900 is illustrated having a similar configuration to layer 901, where each symbol set includes two synchronization symbols 909, 911, a larger number of data symbols 910, 912, and time code symbols 913. The third layer 903 includes two synchronization symbols 914, 916, and a larger number of data symbols 915, 917. The data symbols in each symbol set for the layers (901-903) should preferably have a predefined order and be indexed (e.g., 1, 2, 3). The code components of each symbol in any of the symbol sets should preferably have selected frequencies that are different from the code components of every other symbol in the same symbol set. Under one embodiment, none of the code component frequencies used in representing the symbols of a message in one layer (e.g., Layer1 901) is used to represent any symbol of another layer (e.g., Layer2 902). In another embodiment, some of the code component frequencies used in representing symbols of messages in one layer (e.g., Layer3 903) may be used in representing symbols of messages in another layer (e.g., Layer1 901). However, in this embodiment, it is preferable that "shared" layers have differing formats (e.g., Layer3 903, Layer1 901) in order to assist the decoder in separately decoding the data contained therein.

Sequences of data symbols within a given layer are preferably configured so that each sequence is paired with the other and is separated by a predetermined offset. Thus, as an example, if data 905 contains code 1, 2, 3 having an offset of "2", data 907 in layer 901 would be 3, 4, 5. Since the same information is represented by two different data symbols that are separated in time and have different frequency components (frequency content), the message may be diverse in both time and frequency. Such a configuration is particularly advantageous where interference would otherwise render data symbols undetectable. Under one embodiment, each of the symbols in a layer have a duration (e.g., 0.2-0.8 sec) that matches other layers (e.g., Layer1 901, Layer2 902). In another embodiment, the symbol duration may be different (e.g., Layer 2 902, Layer 3 903). During a decoding process, the decoder detects the layers and reports any predetermined segment that contains a code.

Figure 15:
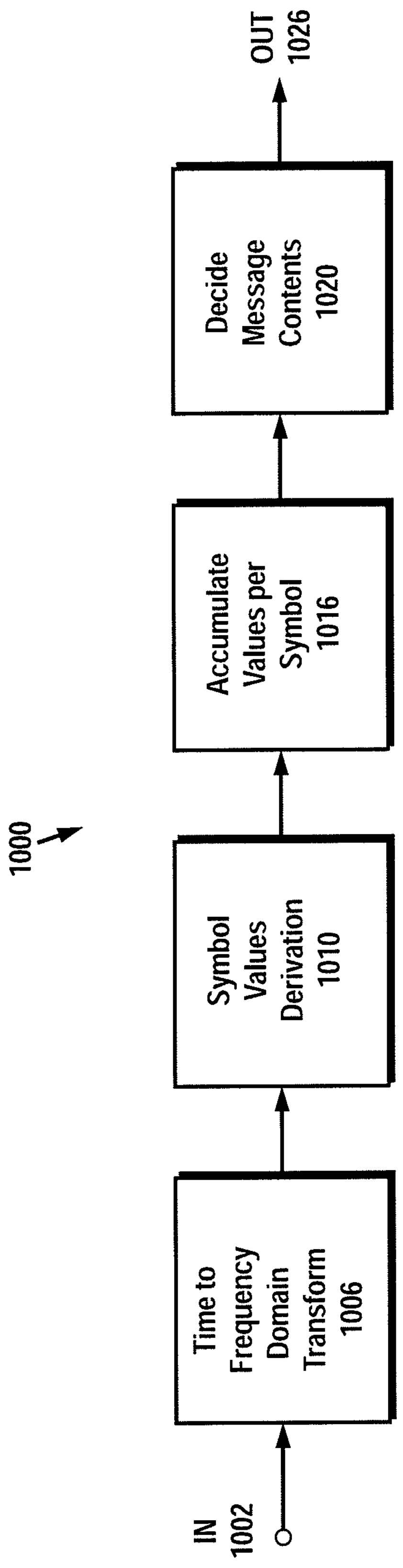
FIG. 15 is a block diagram illustrating an example decoding apparatus.

FIG. 15 is a functional block diagram illustrating a decoding apparatus under one embodiment. An audio signal which may be encoded as described hereinabove with a plurality of code symbols, is received at an input 1002. The received audio signal may be from streaming media, broadcast, otherwise communicated signal, or a signal reproduced from storage in a device. It may be a direct-coupled or an acoustically coupled signal. From the following description in connection with the accompanying drawings, it will be appreciated that decoder 1000 is capable of detecting codes in addition to those arranged in the formats disclosed hereinabove.

For received audio signals in the time domain, decoder 1000 transforms such signals to the frequency domain by means of function 1006. Function 1006 preferably is performed by a digital processor implementing a fast Fourier transform (FFT) although a direct cosine transform, a chirp transform or a Winograd transform algorithm (WFTA) may be employed in the alternative. Any other time-to-frequency-domain transformation function providing the necessary resolution may be employed in place of these. It will be appreciated that in certain implementations, function 306 may also be carried out by filters, by an application specific integrated circuit, or any other suitable device or combination of devices. Function 1006 may also be implemented by one or more devices which also implement one or more of the remaining functions illustrated in FIG. 15.

The frequency domain-converted audio signals are processed in a symbol values derivation function 1010, to produce a stream of symbol values for each code symbol included in the received audio signal. The produced symbol values may represent, for example, signal energy, power, sound pressure level, amplitude, etc., measured instantaneously or over a period of time, on an absolute or relative scale, and may be expressed as a single value or as multiple values. Where the symbols are encoded as groups of single frequency components each having a predetermined frequency, the symbol values preferably represent either single frequency component values or one or more values based on single frequency component values. Function 1010 may be carried out by a digital processor, such as a DSP which advantageously carries out some or all of the other functions of decoder 1000. However, the function 1010 may also be carried out by an application specific integrated circuit, or by any other suitable device or combination of devices, and may be implemented by apparatus apart from the means which implement the remaining functions of the decoder 1000.

The stream of symbol values produced by the function 1010 are accumulated over time in an appropriate storage device on a symbol-by-symbol basis, as indicated by function 1016. In particular, function 1016 is advantageous for use in decoding encoded symbols which repeat periodically, by periodically accumulating symbol values for the various possible symbols. For example, if a given symbol is expected to recur every X seconds, the function 1016 may serve to store a stream of symbol values for a period of nX seconds (n>1), and add to the stored values of one or more symbol value streams of nX seconds duration, so that peak symbol values accumulate over time, improving the signal-to-noise ratio of the stored values. Function 1016 may be carried out by a digital processor, such as a DSP, which advantageously carries out some or all of the other functions of decoder 1000. However, the function 1010 may also be carried out using a memory device separate from such a processor, or by an application specific integrated circuit, or by any other suitable device or combination of devices, and may be implemented by apparatus apart from the means which implements the remaining functions of the decoder 1000.

The accumulated symbol values stored by the function 1016 are then examined by the function 1020 to detect the presence of an encoded message and output the detected message at an output 1026. Function 1020 can be carried out by matching the stored accumulated values or a processed version of such values, against stored patterns, whether by correlation or by another pattern matching technique. However, function 1020 advantageously is carried out by examining peak accumulated symbol values and their relative timing, to reconstruct their encoded message. This function may be carried out after the first stream of symbol values has been stored by the function 1016 and/or after each subsequent stream has been added thereto, so that the message is detected once the signal-to-noise ratios of the stored, accumulated streams of symbol values reveal a valid message pattern.

Figure 16:
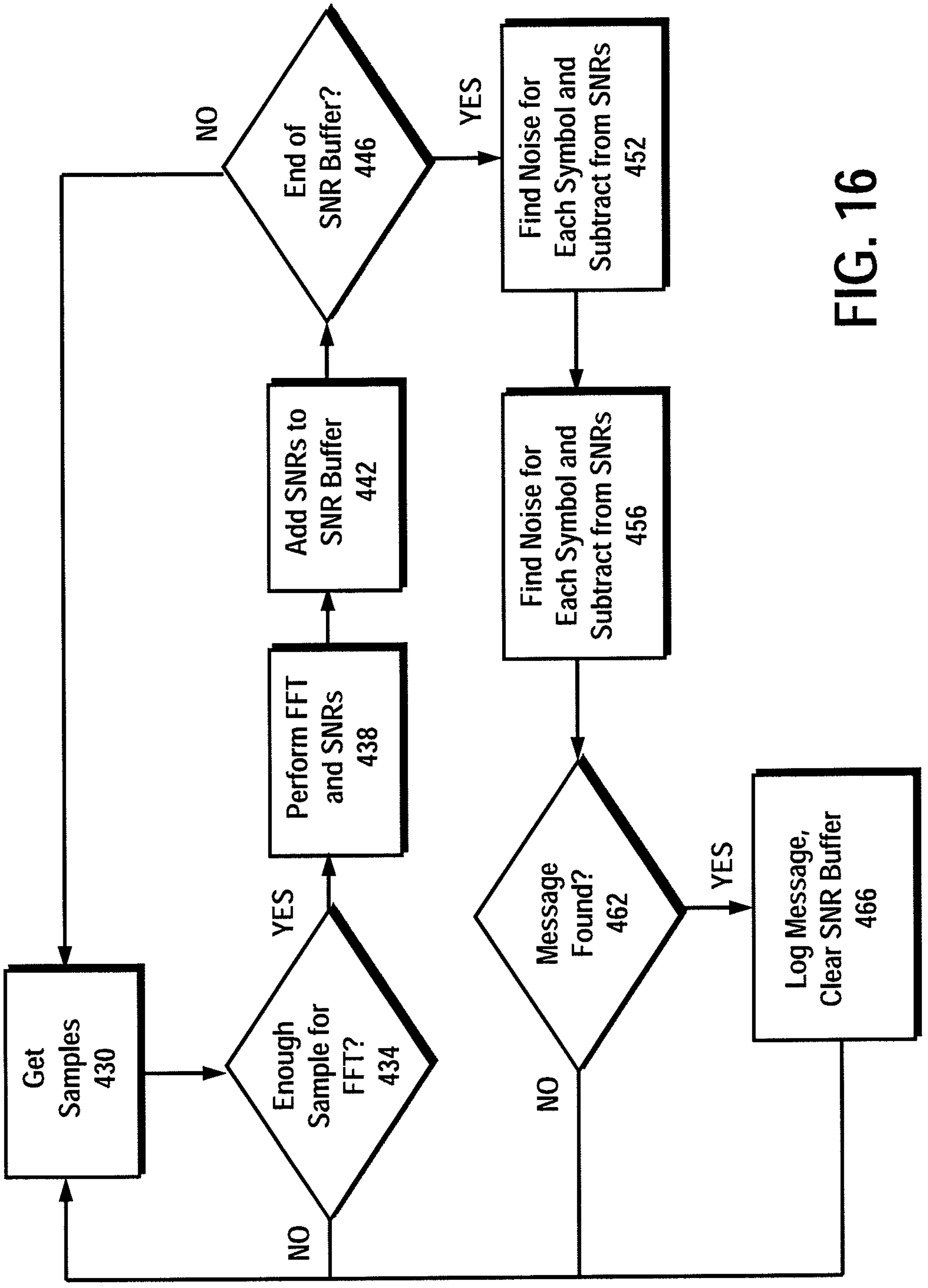
FIG. 16 is a flow chart representative of example machine readable instructions that may be executed to implement an example decoder of FIG. 15 to detect code symbols in a signal.

FIG. 16 is a flow chart for a decoder according to one advantageous embodiment of the invention implemented by means of a DSP. Step 430 is provided for those applications in which the encoded audio signal is received in analog form, for example, where it has been picked up by a microphone or an RF receiver. The decoder of FIG. 15 is particularly well adapted for detecting code symbols each of which includes a plurality of predetermined frequency components, e.g. ten components, within a frequency range of 1000 Hz to 3000 Hz. In this embodiment, the decoder is designed specifically to detect a message having a specific sequence wherein each symbol occupies a specified time interval (e.g., 0.5 sec). In this exemplary embodiment, it is assumed that the symbol set consists of twelve symbols, each having ten predetermined frequency components, none of which is shared with any other symbol of the symbol set. It will be appreciated that the FIG. 15 decoder may readily be modified to detect different numbers of code symbols, different numbers of components, different symbol sequences and symbol durations, as well as components arranged in different frequency bands.

In order to separate the various components, the DSP repeatedly carries out FFTs on audio signal samples falling within successive, predetermined intervals. The intervals may overlap, although this is not required. In an exemplary embodiment, ten overlapping FFT's are carried out during each second of decoder operation. Accordingly, the energy of each symbol period falls within five FFT periods. The FFT's are preferably windowed, although this may be omitted in order to simplify the decoder. The samples are stored and, when a sufficient number are thus available, a new FFT is performed, as indicated by steps 434 and 438.

In this embodiment, the frequency component values are produced on a relative basis. That is, each component value is represented as a signal-to-noise ratio (SNR), produced as follows. The energy within each frequency bin of the FFT in which a frequency component of any symbol can fall provides the numerator of each corresponding SNR Its denominator is determined as an average of adjacent bin values. For example, the average of seven of the eight surrounding bin energy values may be used, the largest value of the eight being ignored in order to avoid the influence of a possible large bin energy value which could result, for example, from an audio signal component in the neighborhood of the code frequency component. Also, given that a large energy value could also appear in the code component bin, for example, due to noise or an audio signal component, the SNR is appropriately limited. In this embodiment, if SNR>6.0, then SNR is limited to 6.0, although a different maximum value may be selected.

The ten SNR's of each FFT and corresponding to each symbol which may be present, are combined to form symbol SNR's which are stored in a circular symbol SNR buffer, as indicated in step 442. In certain embodiments, the ten SNR's for a symbol are simply added, although other ways of combining the SNR's may be employed. The symbol SNR's for each of the twelve symbols are stored in the symbol SNR buffer as separate sequences, one symbol SNR for each FFT for 50 µl FFT's. After the values produced in the 50 FFT's have been stored in the symbol SNR buffer, new symbol SNR's are combined with the previously stored values, as described below.

When the symbol SNR buffer is filled, this is detected in a step 446. In certain advantageous embodiments, the stored SNR's are adjusted to reduce the influence of noise in a step 452, although this step may be optional. In this optional step, a noise value is obtained for each symbol (row) in the buffer by obtaining the average of all stored symbol SNR's in the respective row each time the buffer is filled. Then, to compensate for the effects of noise, this average or "noise" value is subtracted from each of the stored symbol SNR values in the corresponding row. In this manner, a "symbol" appearing only briefly, and thus not a valid detection, is averaged out over time.

After the symbol SNR's have been adjusted by subtracting the noise level, the decoder attempts to recover the message by examining the pattern of maximum SNR values in the buffer in a step 456. In certain embodiments, the maximum SNR values for each symbol are located in a process of successively combining groups of five adjacent SNR's, by weighting the values in the sequence in proportion to the sequential weighting (6 10 10 10 6) and then adding the weighted SNR's to produce a comparison SNR centered in the time period of the third SNR in the sequence. This process is carried out progressively throughout the fifty FFT periods of each symbol. For example, a first group of five SNR's for a specific symbol in FFT time periods (e.g., 1-5) are weighted and added to produce a comparison SNR for a specific FFT period (e.g., 3). Then a further comparison SNR is produced using the SNR's from successive FFT periods (e.g., 2-6), and so on until comparison values have been obtained centered on all FFT periods. However, other means may be employed for recovering the message. For example, either more or less than five SNR's may be combined, they may be combined without weighing, or they may be combined in a non-linear fashion.

After the comparison SNR values have been obtained, the decoder examines the comparison SNR values for a message pattern. Under a preferred embodiment, the synchronization ("marker") code symbols are located first. Once this information is obtained, the decoder attempts to detect the peaks of the data symbols. The use of a predetermined offset between each data symbol in the first segment and the corresponding data symbol in the second segment provides a check on the validity of the detected message. That is, if both markers are detected and the same offset is observed between each data symbol in the first segment and its corresponding data symbol in the second segment, it is highly likely that a valid message has been received. If this is the case, the message is logged, and the SNR buffer is cleared 466. It is understood by those skilled in the art that decoder operation may be modified depending on the structure of the message, its timing, its signal path, the mode of its detection, etc., without departing from the scope of the present invention. For example, in place of storing SNR's, FFT results may be stored directly for detecting a message.

Figure 17:
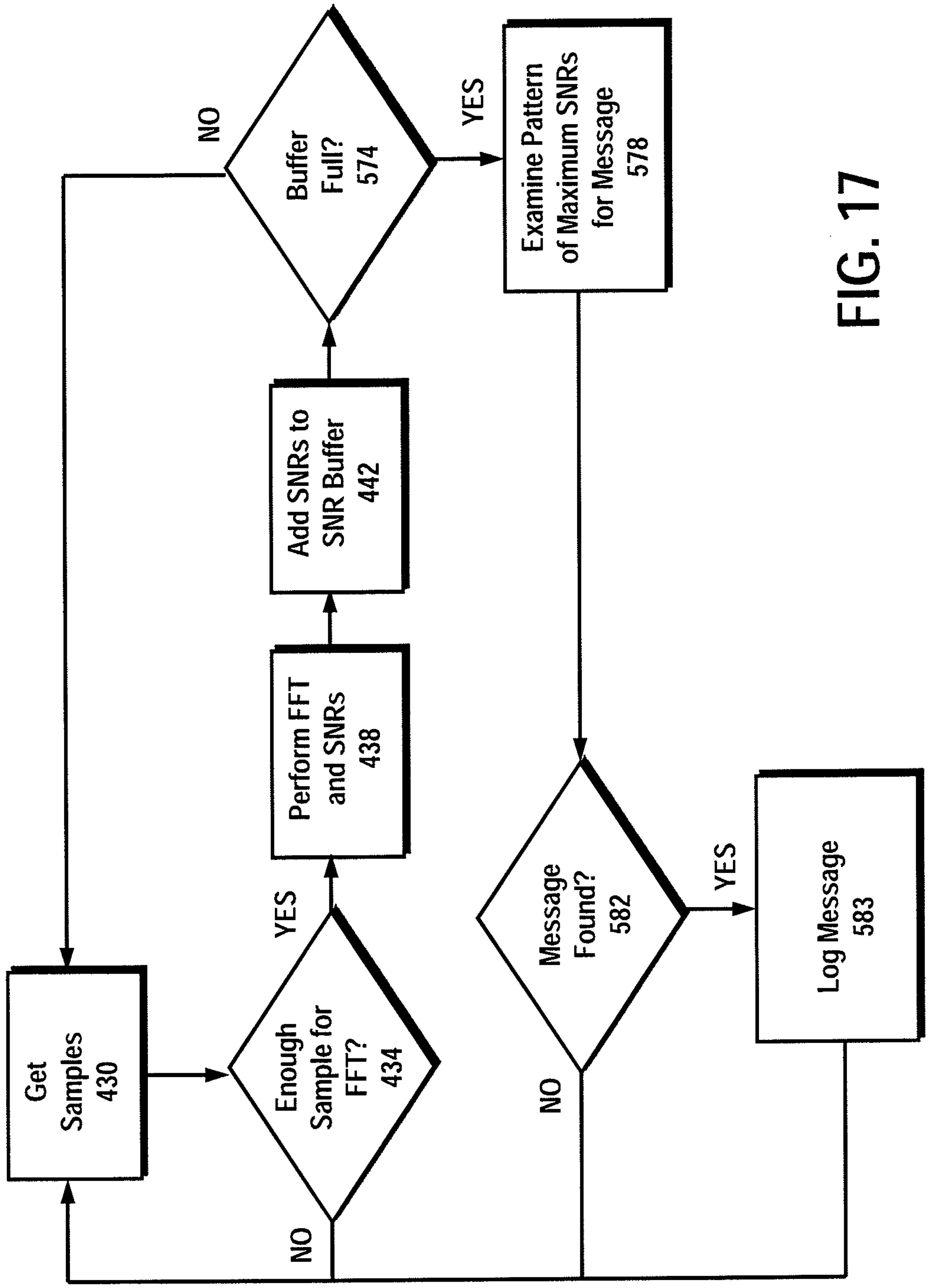
FIG. 17 is a flow chart representative of example machine readable instructions that may be executed to implement another example decoder to detect code symbols in a signal.

FIG. 17 is a flow chart for another decoder according to a further advantageous embodiment likewise implemented by means of a DSP. The decoder of FIG. 17 is especially adapted to detect a repeating sequence of code symbols (e.g., 5 code symbols) consisting of a marker symbol followed by a plurality (e.g., 4) data symbols wherein each of the code symbols includes a plurality of predetermined frequency components and has a predetermined duration (e.g., 0.5 sec) in the message sequence. It is assumed in this example that each symbol is represented by ten unique frequency components and that the symbol set includes twelve different symbols. It is understood that this embodiment may readily be modified to detect any number of symbols, each represented by one or more frequency components.

Steps employed in the decoding process illustrated in FIG. 17 which correspond to those of FIG. 16 are indicated by the same reference numerals, and these steps consequently are not further described. The FIG. 17 embodiment uses a circular buffer which is twelve symbols wide by 150 FFT periods long. Once the buffer has been filled, new symbol SNRs each replace what are than the oldest symbol SNR values. In effect, the buffer stores a fifteen second window of symbol SNR values. As indicated in step 574, once the circular buffer is filled, its contents are examined in a step 578 to detect the presence of the message pattern. Once full, the buffer remains full continuously, so that the pattern search of step 578 may be carried out after every FFT.

Since each five symbol message repeats every 2½ seconds, each symbol repeats at intervals of 2½ seconds or every 25 FFT's. In order to compensate for the effects of burst errors and the like, the SNR's R1 through R150 are combined by adding corresponding values of the repeating messages to obtain 25 combined SNR values SNRn, n=1, 2 . . . 25, as follows:

$$SNR_n = \sum_{i=0}^{5} R_{n+25i}$$

Accordingly, if a burst error should result in the loss of a signal interval i, only one of the six message intervals will have been lost, and the essential characteristics of the combined SNR values are likely to be unaffected by this event.

Once the combined SNR values have been determined, the decoder detects the position of the marker symbol's peak as indicated by the combined SNR values and derives the data symbol sequence based on the marker's position and the peak values of the data symbols. Once the message has thus been formed, as indicated in steps 582 and 583, the message is logged. However, unlike the embodiment of FIG. 16 the buffer is not cleared. Instead, the decoder loads a further set of SNR's in the buffer and continues to search for a message.

As in the decoder of FIG. 16, it will be apparent from the foregoing to modify the decoder of FIG. 17 for different message structures, message timings, signal paths, detection modes, etc., without departing from the scope of the present invention. For example, the buffer of the FIG. 17 embodiment may be replaced by any other suitable storage device; the size of the buffer may be varied; the size of the SNR values windows may be varied, and/or the symbol repetition time may vary. Also, instead of calculating and storing signal SNR's to represent the respective symbol values, a measure of each symbol's value relative to the other possible symbols, for example, a ranking of each possible symbol's magnitude, is instead used in certain advantageous embodiments.

In a further variation which is especially useful in audience measurement applications, a relatively large number of message intervals are separately stored to permit a retrospective analysis of their contents to detect a channel change. In another embodiment, multiple buffers are employed, each accumulating data for a different number of intervals for use in the decoding method of FIG. 17. For example, one buffer could store a single message interval, another two accumulated intervals, a third four intervals and a fourth eight intervals. Separate detections based on the contents of each buffer are then used to detect a channel change.

Figure 18:
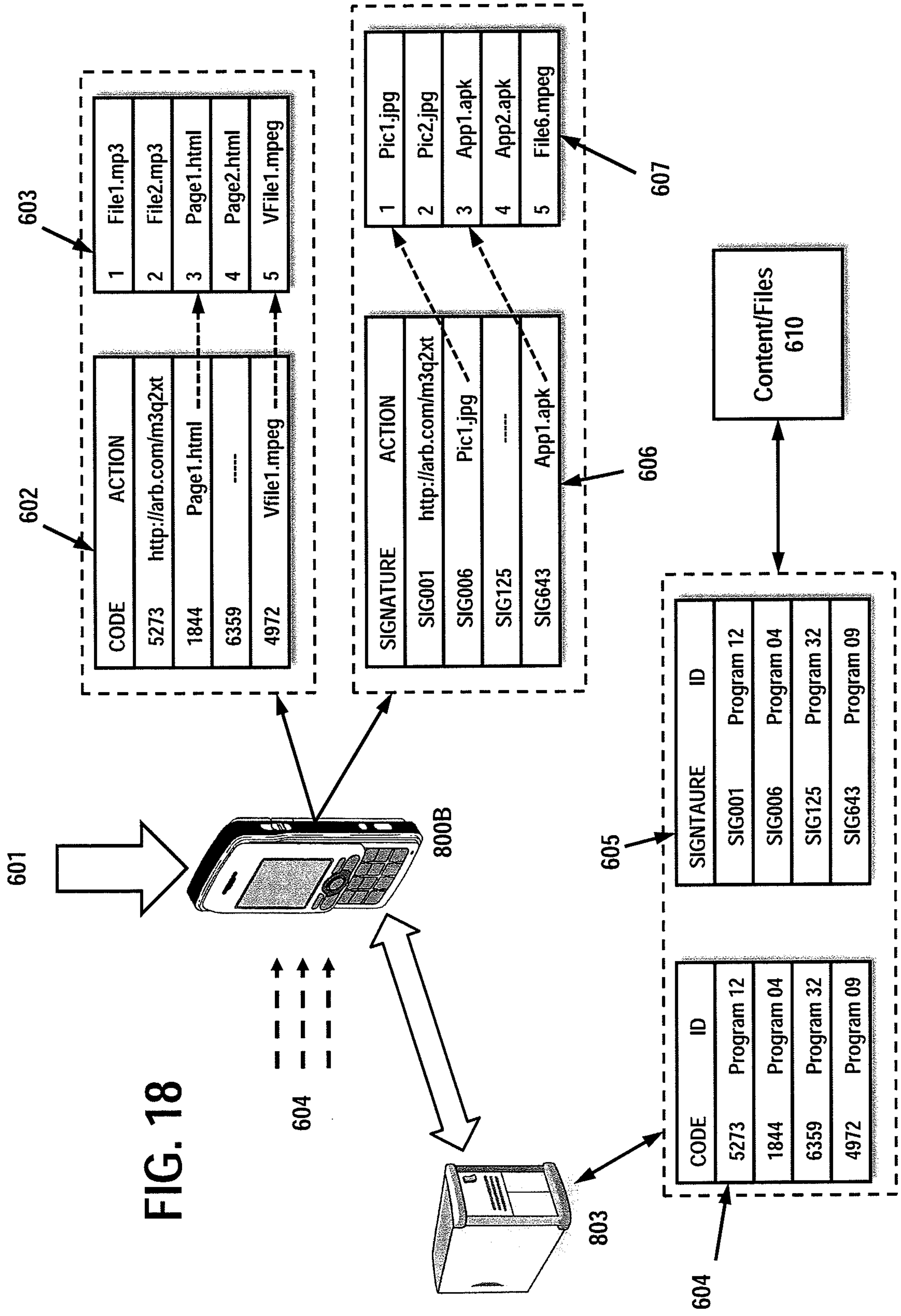
FIG. 18 illustrates an example cell phone that receives audio through a microphone or through a data connection.

Turning to FIG. 18, an exemplary embodiment is illustrated, where a cell phone 800B receives audio 604 either through a microphone or through a data connection (e.g., WiFi). It is understood that, while the embodiment of FIG. 18 is described in connection with a cell phone, other devices, such as PC's tablet computers and the like, are contemplated as well. Under one embodiment, supplementary research data (601) is "pushed" to phone 800B, and may include information such as a code/action table 602 and related supplementary content 603. Additionally, supplementary data 601 may include a signature/action table 606 and related supplementary content 607. The content is preferably pushed at predetermined times (e.g., once a day at 8:00 AM) and resides on phone 800B for a limited time period, or until a specific event occurs.

Given that accumulated supplementary data on a device is generally undesirable, it is preferred that pushed content be erased from the device to avoid excessive memory usage. Under one example, content (603, 607) would be pushed to cell phone 800B and would reside in the phone's memory until the next "push" is received. When the content from the second push is stored, the content from the previous push is erased. An erase command (and/or other commands) may be contained in the pushed data, or may be contained in data decoded from audio. Under another embodiment, multiple content pushes may be stored, and the phone may be configured to keep a predetermined amount of pushed content (e.g., seven consecutive days). Under yet another embodiment, cell phone 800B may be enabled with a protection function to allow a user to permanently store selected content that was pushed to the device. Such a configuration is particularly advantageous if a user wishes to keep the content and prevent it from being automatically deleted. Cell phone 800B may even be configured to allow a user to protect content over time increments (e.g., selecting "save today's content").

Referring to FIG. 18, pushed content 601 comprises code/action table 602, that includes one or more codes (5273, 1844, 6359, 4972) and an associated action. Here, the action may be the execution of a link, display of a HTML page, playing of multimedia, or the like. As audio is decoded using any of the techniques described above, one or more messages are formed on device 800B. Since the messages may be distributed over multiple layers, a received message may include identification data pertaining to the received audio, along with a code, and possibly other data.

Each respective code may be associated with a particular action. In the example of FIG. 18, code "5273" is associated with a linking action, which in this case is a shortened URL (http://arb.com/m3q2xt). The link is used to automatically connect device 800B to a network. Detected code "1844" is associated with HTML page "Pagel.html" which may be retrieved on the device from the pushed content 603 (item 3). Detected code "6359" is not associated with any action, while detected code "4972" is associated with playing video file "VFile1.mpg" which is retrieved from pushed content 603 (item 5). As each code is detected, it is processed using 602 to determine if an action should be taken. In some cases, an action is triggered, but in other cases, no action is taken. In any event, the detected codes are separately transmitted via wireless or wired connection to server 803, which processes code 604 to produce research data that identifies the content received on device 800B.

Utilizing encoding/decoding techniques disclosed herein, more complex arrangements can be made for incorporating supplementary data into the encoded audio. For example, multimedia identification codes can be embedded in one layer, while supplementary data (e.g., URL link) can be embedded in a second layer. Execution/activation instruction codes may be embedded in a third layer, and so on. Multilayer messages may also be interspersed between or among media identification messages to allow customized delivery of supplementary data according to a specific schedule.

In addition to code/action table 602, a signature/action table 606 may be pushed to device 800B as well. It is understood by those skilled in the art that signature table 606 may be pushed together with code table 602, or separately at different times. Signature table 606 similarly contains action items associated with at least one signature. As illustrated in FIG. 18, a first signature SIG001 is associated with a linking action, which in this case is a shortened URL (http://arb.com/m3q2xt). The link is used to automatically connect device 800B to a network. Signature SIG006 is associated with a digital picture "Pic1.jpg" which may be retrieved on the device from the pushed content 607 (item 1). Signature SIG125 is not associated with any action, while signature SIG643 is associated with activating software application "App1.apk" which accessed from pushed content 607 (item 3), or may be also may be residing as a native application on device 800B. As each signature is extracted, it is processed using 606 to determine if an action should be taken. In some cases, an action is triggered, but in other cases, no action is taken. Since audio signatures are transitory in nature, in a preferred embodiment, multiple signatures are associated with a single action. Thus, as an example, if device 800B is extracting signatures from the audio of a commercial, the configuration may be such that the plurality of signatures extracted from the commercial are associated with a single action on device 800B. This configuration is particularly advantageous in properly executing an action when signatures are being extracted in a noisy environment. In any event, the extracted signatures are transmitted via wireless or wired connection to server 803, which processes signatures 605 to produce research data that identifies the content received on device 800B.

In addition to performing actions on the device, the codes and signatures transmitted from device 800B may be processed remotely in server 803 to determine personalized content and/or files 610 that may be transmitted back to device 800B. More specifically, content identified from any of 604 and/or 605 may be processed and alternately correlated with demographic data relating to the user of device 800B to generate personalized content, software, etc. that is presented to user of device 800B. These processes may be performed on server 803 alone or together with other servers or in a “cloud.”

Figure 19:
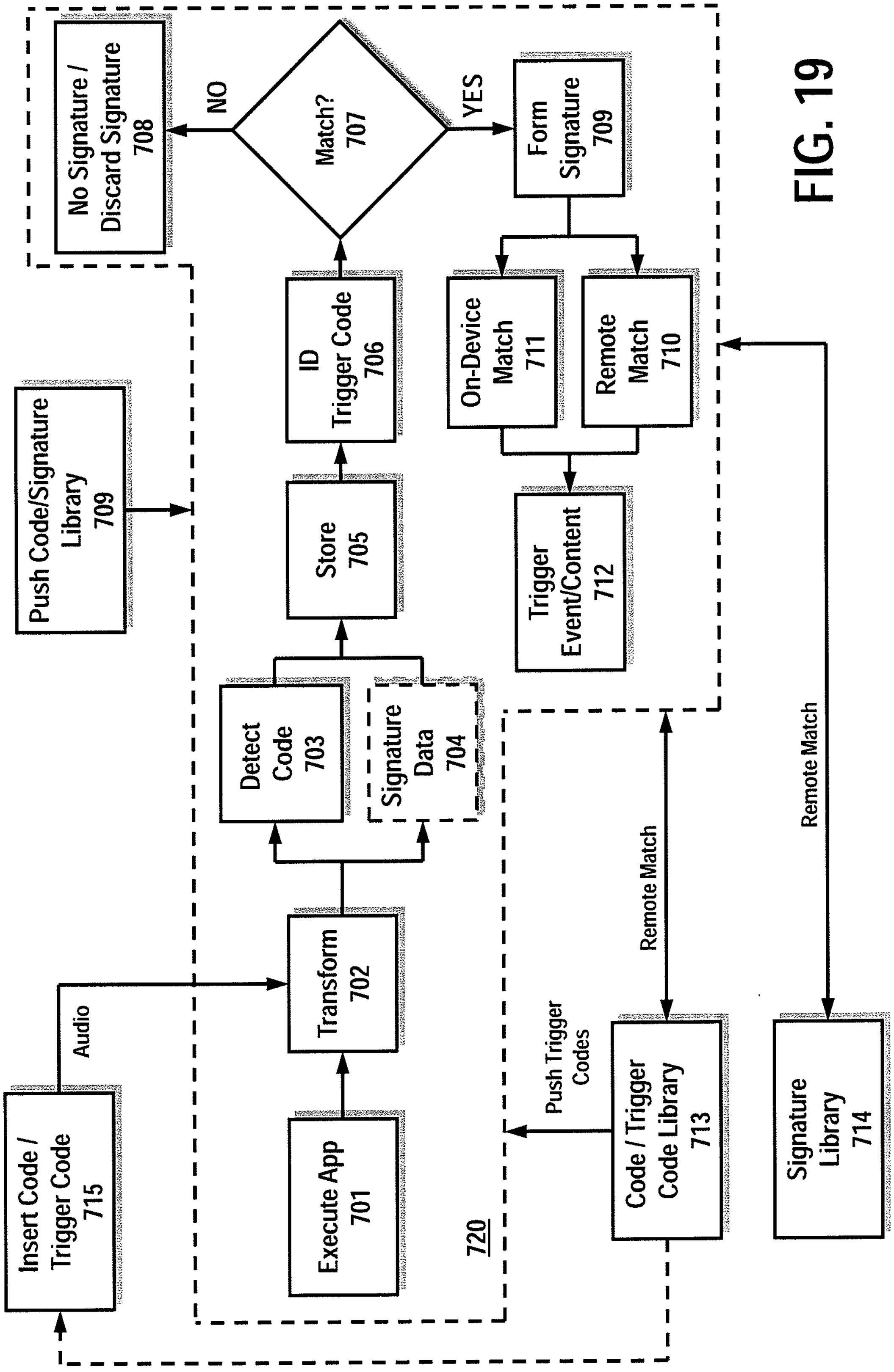
FIG. 19 is a flow chart representative of example machine readable instructions that may be executed to implement a metering application to detect audio codes and generate signatures based on audio.

Turning now to FIG. 19, an exemplary process flow is illustrated for device 720, which under one embodiment executes a metering software application 703, allowing it to detect audio codes and extract signatures from audio. In this case, audio is encoded with codes that may include monitoring codes, also referred to herein as “trigger” codes 715, similar to those described above in connection with FIGS. 1-2 et al. These codes and other codes are preferably provided via a dedicated code library 713, where the codes are inserted at the point of transmission or broadcast. When audio from media is received in device 720, a transform is performed 702 on the audio where trigger code(s) 703 may be detected. It is understood that other and/or additional codes may be detected as well. Under one embodiment, trigger code is detected and stored in 705. Next, an identification process is performed 706 to determine if the trigger code forms a proper match 707 to codes pushed to device 720 from library 709. If no match is found, no signature is formed 708 from the audio. In another embodiment, signature data 704 is generated from the transform together with code 703, using techniques described and disclosed in U.S. Pat. No. 7,908,13. After the signature data is formed, it is stored 705, together with the code from 703. If, during identification 708 and matching 707, it is determined that no match exists, the stored signature data is discarded in 708. This embodiment can be advantageous for allowing device 720 to quickly form signatures, while still preserving resources and memory.

In one embodiment, the detection and identification of one or more trigger codes begins the signature extraction process. Additional codes may continue to be received that (a) may be used to perform other actions on device 720, and/or (b) serve to identify the received media. These additional codes may be collected concurrently with the signature(s) or may be collected at different times. Under one advantageous embodiment, the trigger code may be used to set predetermined time periods in which signatures are collected, regardless of whether or not any further code is collected. This can be useful in situations when users switch from encoded media content to non-encoded media content. If one or more codes are detected during that time period, the signatures may be discarded. Additionally, device 720 can execute rules such that a predetermine amount of code must be collected before any signatures are discarded.

Still referring to FIG. 19, if a match in 707 is determined to exist, a signature is formed and extracted from the audio in 709. In one embodiment, the signature is extracted from audio stored in a buffer. In another embodiment, the signature data stored in 705 is processed to form an extracted signature. Once the signature is extracted, device 720 has the option of performing on-device matching 711 (see, FIG. 18, refs. 602-603, 606-607) or remote matching 710 of the signature and/or the code. If a match is performed on device 720, the match is made against a code/signature library 709 that was previously pushed to device 720, much like the embodiment discussed above in FIG. 18. Detected matches trigger an action 712 to be performed on device 720, such as the presentation of content, activation of software, etc. If a match is performed remotely, codes are compared to code library 713, while signatures are compared to signature library 714, both of which may reside in one or more networked servers (e.g., 803). Matches in this case are made on the server(s), where the results of the matches are processed and used to obtain personalized content, software, etc. (see 610) that may be transmitted back to device 720 or to other devices or locations.

In an alternate embodiment, content, software, etc. obtained from the remote processing is not only transmitted to device 720, but is also transmitted to other devices that may or may not be registered by the user of device 720. Additionally, the content, software, etc. does not have to occur in real-time, but may be performed at pre-determined times, or upon the detection of an event (e.g., device 720 is being charged or is idle). Furthermore, using a suitably-configured device, detection of certain codes/signatures may be used to affect or enhance performance of device 720. For example, detection of certain codes/signatures may unlock features on the device or enhance connectivity to a network. Moreover, actions performed as a result of media exposure detection can be used to control and/or configure other devices that are otherwise unrelated to media. For example, one exemplary action may include the transmission of a control signal to a device, such as a light dimmer, to dim the room lights when a particular program is detected. It is appreciated by those skilled in the art that a multitude of options are available using the techniques described herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of performing an action in a device based on receipt of and/or exposure to audio, comprising:

receiving audio at the device, the audio having a monitoring code indicating that the audio is to be monitored;

in response to detection of the monitoring code, generating a signature based on the audio using at least a portion of the audio containing the monitoring code; and causing the performance of the action at least in part by the device based on at least one of the monitoring code or the signature.

2. The method of claim 1, wherein the monitoring code comprises a plurality of substantially single-frequency code components.

3. The method of claim 2, wherein generating the signature comprises one of (a) generating a signature data set reflecting time-domain variations of the received audio in a plurality of frequency sub-bands of the received audio, or (b) generating a signature data set reflecting frequency-domain variations in the received audio.

4. The method according to claim 1, wherein the action comprises presenting at least one of video, audio, images, HyperText Markup Language (HTML) content, a Uniform Resource Locator (URL), a shortened URL, metadata, or text.

5. The method according to claim 1, wherein the action comprises activating software on the device.

6. The method according to claim 1, wherein the action comprises processing at least one of the monitoring code or the signature on the device.

7. The method according to claim 1, wherein the action comprises transmitting at least one of the monitoring code or the signature from the device for processing, and receiving data in the device generated based on the processing.

8. The method according to claim 1, wherein the device comprises at least one of a cell phone, a smart phone, a personal digital assistant, a personal computer, a portable computer, a television, a set-top box, or a media box.

9. A method of performing an action in a processing device based on receipt of and/or exposure to audio, comprising:

detecting a monitoring code in received audio, the monitoring code indicating that the audio is to be monitored;

generating a signature in response to detection of the monitoring code, the signature representative of the audio, the signature generated based on at least a portion of the audio containing the monitoring code; and performing the action with the device based on at least one of the monitoring code or the signature.

10. The method according to claim 9, wherein the action comprises processing at least one of the monitoring code or the signature on the device to at least one of execute a link, present media, display a web page, or activate software.

11. The method according to claim 9, wherein the action comprises transmitting at least one of the monitoring code or the signature from the device for processing, and receiving data in the device generated based on the processing.

12. A processing device to perform an action based on receipt of and/or exposure to audio, the processing device comprising:

an input device to receive audio carrying a monitoring code indicating that the audio is to be monitored; and a processor to detect the monitoring code and, in response to detection of the monitoring code, generate a signature characterizing the audio using at least a portion of the audio containing the monitoring code, wherein the processor is to cause the performance of the action based on at least one of the monitoring code or the signature.

13. The processing device of claim 12, wherein the monitoring code comprises a plurality of substantially single-frequency code components.

14. The processing device of claim 13, wherein the processor is to generate the signature by one of (a) generating a signature data set reflecting time-domain variations of the received audio data in a plurality of frequency sub-bands of the received audio, or (b) generating a signature data set reflecting frequency-domain variations in the received audio.

15. The processing device according to claim 12, wherein the action comprises presenting at least one of one of video, audio, images, HyperText Markup Language (HTML) content, a Uniform Resource Locator (URL), a shortened URL, metadata, or text.

16. The processing device according to claim 12, wherein the action comprises activating software on the device.

17. The processing device according to claim 12, wherein the action comprises processing at least one of the monitoring code or the signature on the device to at least one of execute a link, present media, display a web page, or activate software.

18. The processing device according to claim 12, further comprising an output device, wherein the action comprises transmitting at least one of the monitoring code or the signature from the device using the output device, and the input device is to receive data generated based on processing of the monitoring code or the signature which occurs separate from the device.

19. The processing device according to claim 12, wherein the processing device comprises at least one of a cell phone, a smart phone, a personal digital assistant, a personal computer, a portable computer, a television, a set-top box, and a media box.

20. The method according to claim 9, wherein the action comprises presenting at least one of video, audio, images, HyperText Markup Language (HTML) content, a Uniform Resource Locator (URL), a shortened URL, metadata, text or activating software on the device.

* * * * *

UNITED STATES PATENT AND TRADEMARK OFFICE

CERTIFICATE OF CORRECTION

PATENT NO. : 8,959,016 B2
APPLICATION NO. : 13/341365
DATED : February 17, 2015
INVENTOR(S) : McKenna et al.

It is certified that error appears in the above-identified patent and that said Letters Patent is hereby corrected as shown below:

Title Page, Related U.S. Application Data, Line 7: replace “continuation” with --continuation-in-part--

Signed and Sealed this
Third Day of November, 2015

Michelle K. Lee
*Director of the United States Patent and Trademark Office*